(12) United States Patent
Karles et al.

(10) Patent No.: US 9,963,291 B2
(45) Date of Patent: May 8, 2018

(54) MULTICOMPARTMENT CAPSULES OF A BEVERAGE FORMING APPARATUS AND METHODS OF MAKING THEREOF

(71) Applicant: ALTRIA CLIENT SERVICES LLC, Richmond, VA (US)

(72) Inventors: Georgios Karles, Richmond, VA (US); Jonathan David Watson, Richmond, VA (US); Gregory James Griscik, Midlothian, VA (US); Christian Schuh, Mechanicsville, VA (US); Munmaya Mishra, Chesterfield, VA (US); Lawrence E. Tipton, Colonial Heights, VA (US); Christopher L. Simpson, Richmond, VA (US); Tracy M. Ogbonlowo, Moseley, VA (US); Rosana C. Altoveros, Chesterfield, VA (US); Dariusz Masiarz, Glen Allen, VA (US)

(73) Assignee: Altria Client Services LLC, Richmond, VA (US)

(*) Notice: Subject to any disclaimer, the term of this patent is extended or adjusted under 35 U.S.C. 154(b) by 0 days. days.

(21) Appl. No.: 15/092,353

(22) Filed: Apr. 6, 2016

(65) Prior Publication Data

US 2017/0290460 A1 Oct. 12, 2017

(51) Int. Cl.
*B65D 85/804* (2006.01)
*A47J 31/40* (2006.01)
(Continued)

(52) U.S. Cl.
CPC ........ *B65D 85/8043* (2013.01); *A47J 31/407* (2013.01); *B65D 1/36* (2013.01); *B65D 85/00* (2013.01)

(58) Field of Classification Search
CPC ...... B65D 85/8043; B65D 1/36; B65D 85/00; A47J 31/407
See application file for complete search history.

(56) References Cited

U.S. PATENT DOCUMENTS 3,607,297 A  9/1971 Fasano
3,823,061 A  7/1974 Frayer et al.
(Continued)

FOREIGN PATENT DOCUMENTS

WO  2015059022 A1  4/2015

OTHER PUBLICATIONS

International Search Report and Written Opinion dated Aug. 7, 2017 in corresponding International Patent Application No. PCT/US2017/24045.

*Primary Examiner* — Erik Kashnikow
*Assistant Examiner* — Chaim A Smith
(74) *Attorney, Agent, or Firm* — Buchanan Ingersoll & Rooney PC

(57) ABSTRACT

A multicompartment capsule for use with a beverage forming apparatus includes a base and a sidewall extending upwardly from the base. The sidewall includes a rim extending outwardly from an upper end thereof. The rim surrounds an opening of the multicompartment capsule wherein an upper surface of the outwardly extending rim is sealed to a lower surface of a lid. At least one partition extends through an interior of the multicompartment capsule so as to form a first sealed compartment that is fluidly isolated from a second sealed compartment. The first sealed compartment includes a first beverage formulation and the second sealed compartment includes a second beverage formulation. The first beverage formulation is reactive with the second beverage formulation and the partition separates the first bev- (Continued)

erage formulation from the second beverage formulation to extend the shelf life of the multicompartment capsule.

18 Claims, 15 Drawing Sheets

(51) Int. Cl.
  B65D 1/36 (2006.01)
  B65D 85/00 (2006.01)

(56) References Cited

U.S. PATENT DOCUMENTS

| | | |
|---|---|---|
| 3,979,020 A | 9/1976 | Braber et al. |
| 3,993,810 A | 11/1976 | Bonis |
| 4,340,138 A | 7/1982 | Bernhardt |
| 4,430,288 A | 2/1984 | Bonis |
| 4,435,244 A | 3/1984 | Beck et al. |
| 4,986,438 A | 1/1991 | Borst |
| 5,472,719 A | 12/1995 | Favre |
| 5,584,634 A | 12/1996 | Okabe et al. |
| 5,637,335 A | 6/1997 | Fond et al. |
| 5,766,525 A | 6/1998 | Anderson et al. |
| 6,142,763 A | 11/2000 | Lee et al. |
| 6,334,290 B1 | 6/2002 | Reichert et al. |
| 7,004,346 B2 | 2/2006 | Schwab |
| 7,540,739 B2 | 6/2009 | Daum |
| 8,033,085 B2 | 10/2011 | Martinez Sampedro |
| 9,108,794 B2 | 8/2015 | Fu et al. |
| 2007/0212550 A1 | 9/2007 | ReFraschini et al. |
| 2008/0317931 A1 | 12/2008 | Mandralis et al. |
| 2014/0272006 A1 | 9/2014 | Schuh et al. |
| 2014/0272019 A1 | 9/2014 | Schuh et al. |
| 2015/0282663 A1 | 10/2015 | Talon |
| 2016/0023874 A1 | 1/2016 | Schraudolph |
| 2016/0023879 A1 | 1/2016 | Walker |

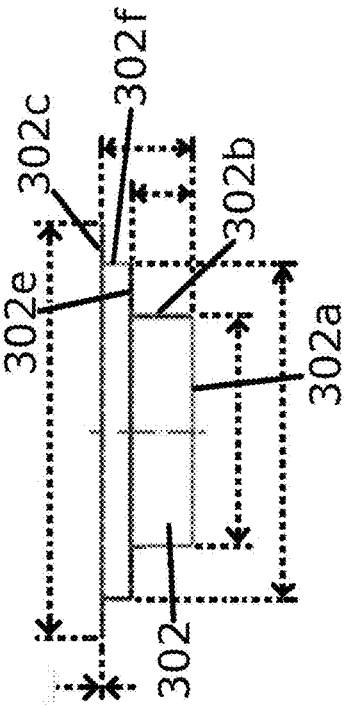
FIG. 3D
FIG. 3F
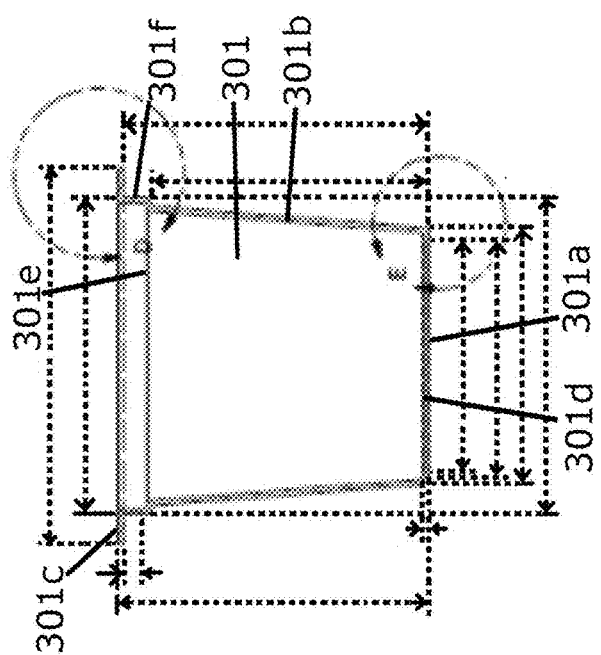
FIG. 3C
FIG. 3E

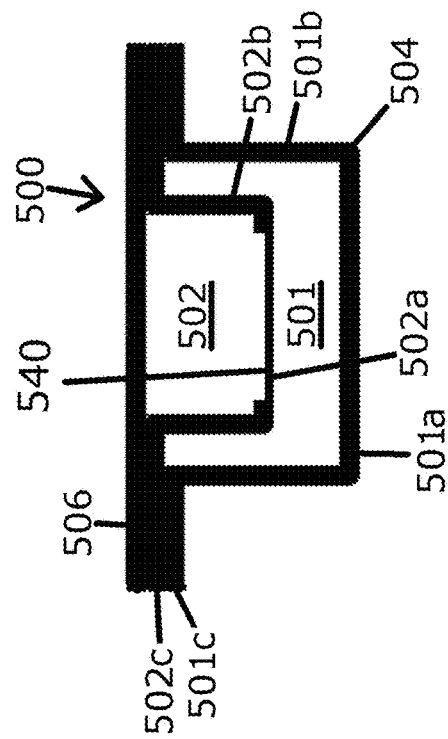
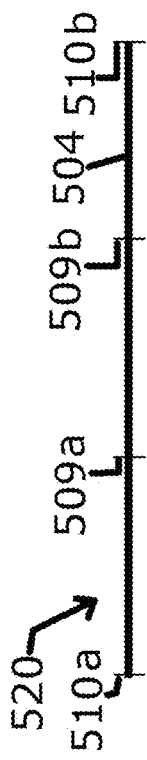
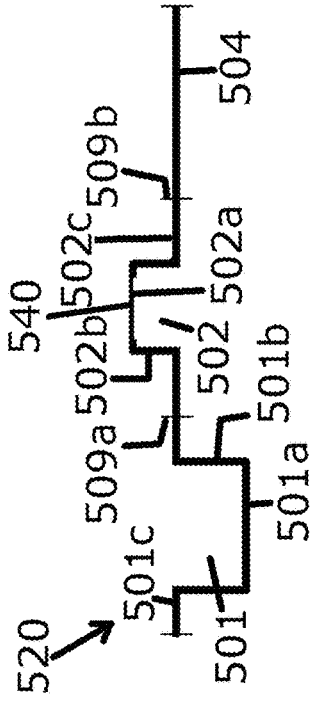
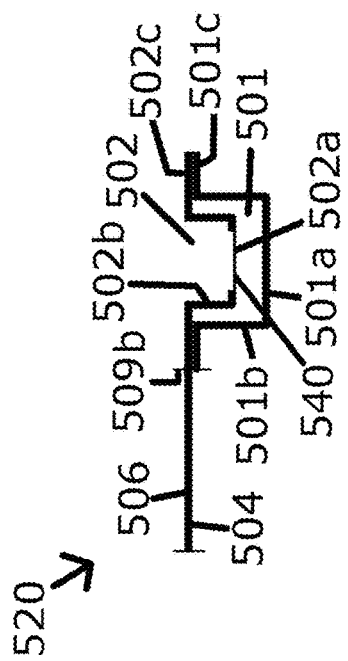

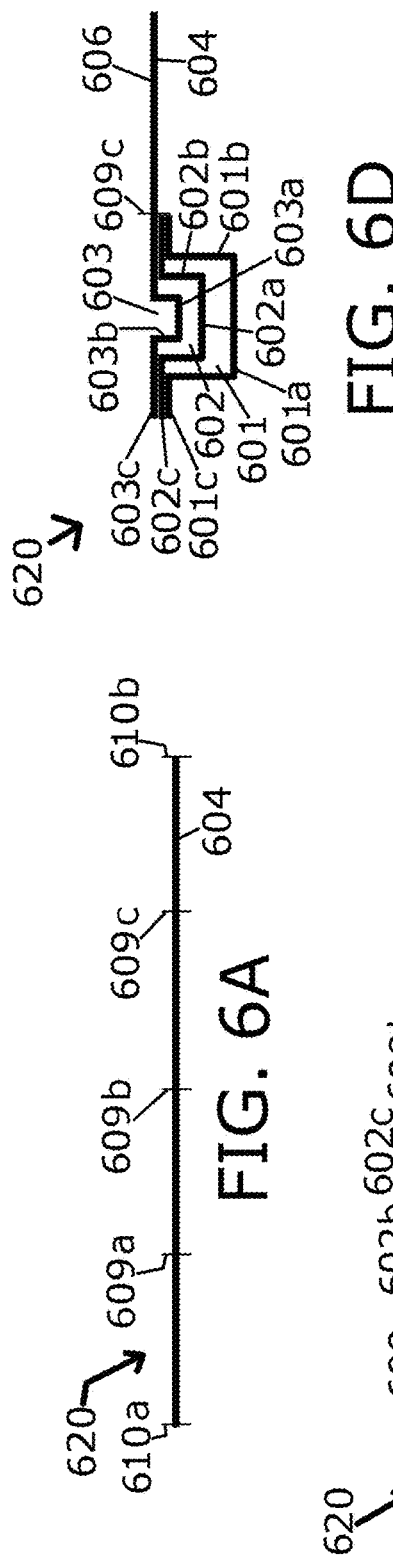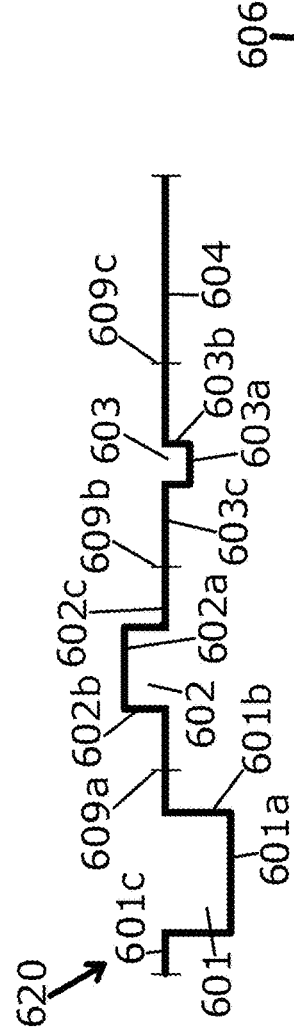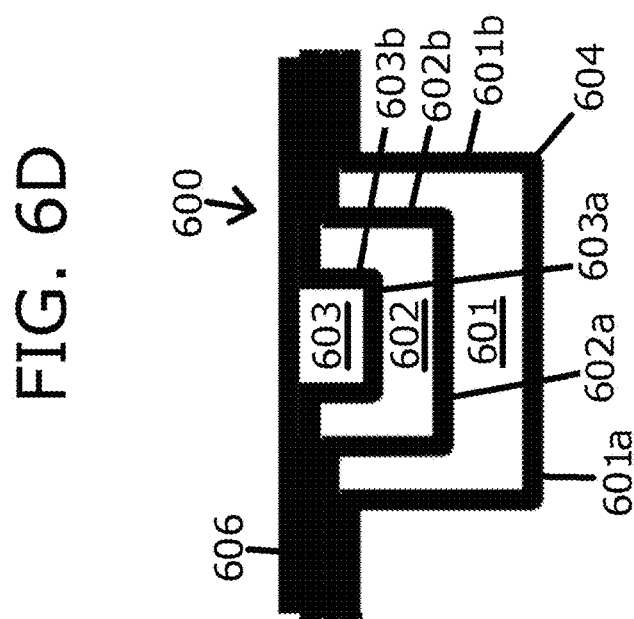

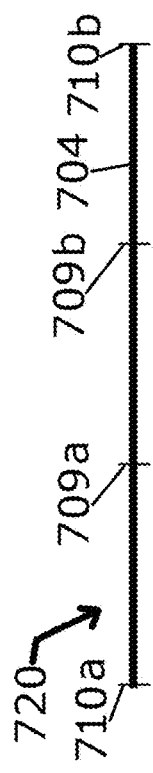
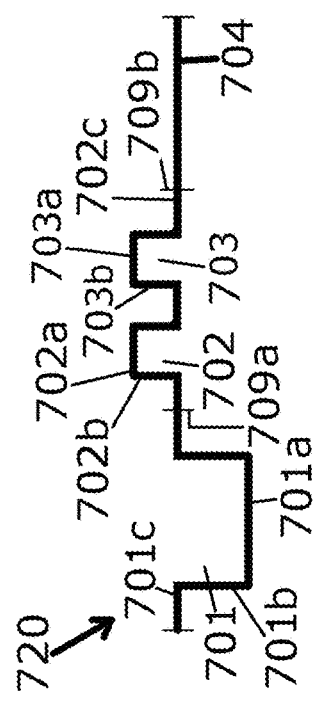
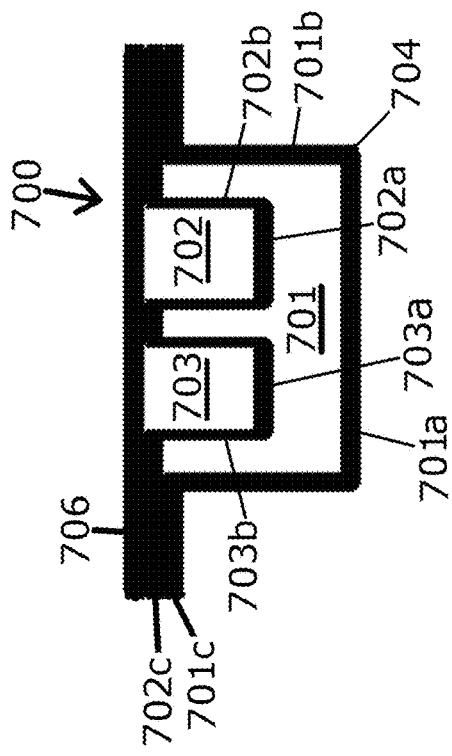
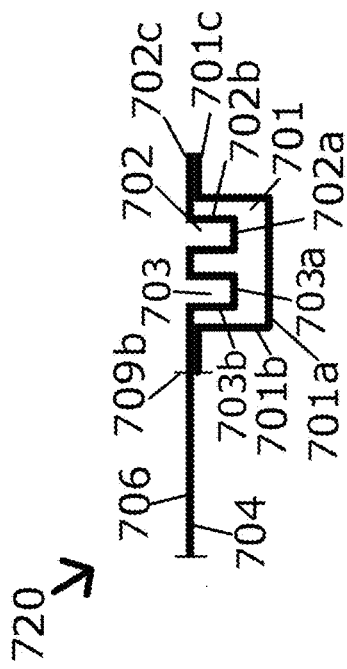
FIG. 7A
FIG. 7B
FIG. 7C
FIG. 7D

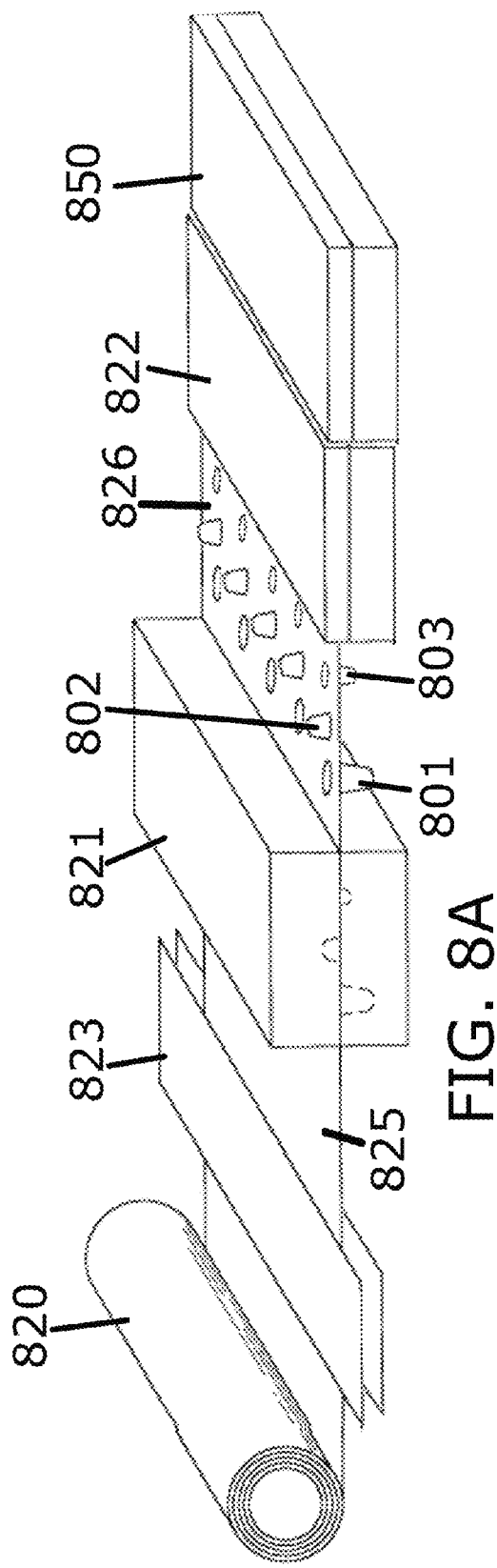
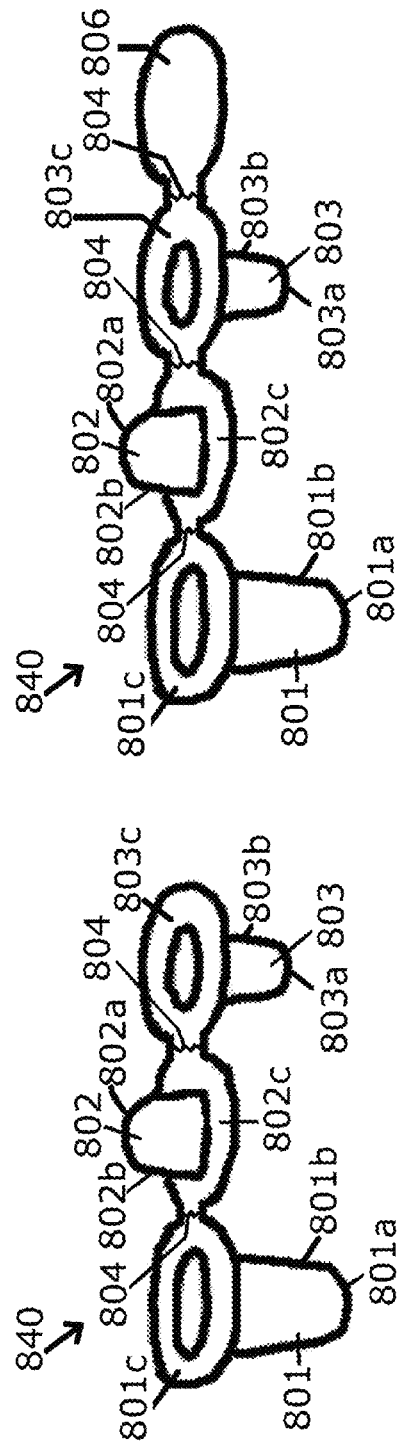
FIG. 8A
FIG. 8B
FIG. 8C

MULTICOMPARTMENT CAPSULES OF A BEVERAGE FORMING APPARATUS AND METHODS OF MAKING THEREOF

FIELD OF THE INVENTION

The invention relates to improvements in capsules of beverage forming apparatuses wherein the capsules contain beverage formulations such that beverages can be formed by combining the beverage formulations included in a respective capsule with liquid supplied by the beverage forming apparatus, and particularly to improvements in extending the shelf life of beverage formulations contained in the capsules.

BACKGROUND

Various capsules have been developed for making beverages when placed in a receptacle of a beverage forming apparatus. The capsules can include a beverage formulation sealed therein. Beverage forming apparatuses make a beverage by opening a capsule and supplying liquid to an interior thereof wherein the liquid combines with the beverage formulation to make a beverage which is then dispensed from the capsule. One challenge in developing capsules has been designing a capsule which has an extended shelf life.

SUMMARY OF SELECTED FEATURES

Disclosed herein is a multicompartment capsule for use with a beverage forming apparatus. The multicompartment capsule includes at least a first compartment and a second compartment formed of a single sheet of polymer material. The first compartment is formed from the single sheet of polymer material and includes a first compartment base and a first compartment sidewall extending upwardly from the first compartment base. The first compartment sidewall includes a first compartment rim extending outwardly from an upper end thereof which surrounds an opening of the first compartment. The second compartment is formed from the single sheet of polymer material and includes a second compartment base and a second compartment sidewall extending upwardly from the second compartment base. The second compartment sidewall includes a second compartment rim extending outwardly from an upper end thereof which surrounds an opening of the second compartment. A folded portion of the single sheet of polymer material extends between an edge of the first compartment rim and an edge of the second compartment rim. An upper surface of the first compartment rim is sealed to a lower surface of the second compartment rim such that the second compartment base and a portion of the second compartment sidewall are located in an interior of the first compartment and the interior of the first compartment is fluidly isolated. A lower surface of a lid is sealed to an upper surface of the multi-compartment capsule such that the opening of the second compartment is sealed and an interior of the second compartment is fluidly isolated.

Also disclosed herein is a multicompartment capsule for use with a beverage forming apparatus. The multicompartment capsule includes a base and a sidewall extending upwardly from the base wherein the sidewall includes a rim extending outwardly from an upper end thereof which surrounds an opening of the multicompartment capsule. An upper surface of the outwardly extending rim is sealed to a lower surface of a lid. At least one partition extends through an interior of the multicompartment capsule so as to form a first sealed compartment that is fluidly isolated from a second sealed compartment. The first sealed compartment includes a first beverage formulation and the second sealed compartment includes a second beverage formulation wherein the first beverage formulation is reactive with the second beverage formulation. The partition separates the first beverage formulation from the second beverage formulation to extend the shelf life of the multicompartment capsule.

Further disclosed herein is a method of making a multicompartment capsule for use with a beverage forming apparatus. The method comprises providing a sheet of thermoformable material to a thermoforming apparatus, and thermoforming the sheet of thermoformable material so as to form at least one group of compartments wherein each group of compartments includes at least a first compartment having a base and an upwardly extending sidewall and a second compartment having a base and a downwardly extending sidewall. The thermoformed sheet is cut so as to separate a single group of compartments wherein the cutting forms a rim that extends outwardly from an upper end of the sidewall of the first compartment and a rim that extends outwardly from a lower end of the sidewall of the second compartment. An interior of a first compartment is filled with a predetermined quantity of a first beverage formulation, and the second compartment is folded at a foldable portion between the first and second compartments so as to locate the base and a portion of the sidewall of the second compartment in an interior of the first compartment. The interior of the second compartment is filled with a predetermined quantity of a second beverage formulation, and the first and second compartments are sealed so as to fluidly isolate the first compartment from the second compartment to make a multi-compartment capsule.

Additionally disclosed herein is a capsule receptacle of a beverage forming apparatus that is operable to receive a multicompartment capsule. The capsule receptacle includes a base and a lid. The base includes a cavity therein that is shaped to receive a multicompartment capsule and the lid is operable to seal the multicompartment capsule in the cavity. A spot heater is operable to heat a portion of a surface of the cavity. The heated surface is configured to be adjacent a thermally detachable partition included in an interior of a multicompartment capsule. The multicompartment capsule is configured to fit in the cavity such that the spot heater is operable to detach a portion of the thermally detachable partition.

BRIEF DESCRIPTION OF THE DRAWINGS

FIGS. 3A-3F show an exploded view and cross-sectional views of a multicompartment capsule for use with a beverage forming apparatus according to an embodiment disclosed herein.

FIGS. 5A-5D show steps of making a multicompartment capsule according to embodiments disclosed herein.

FIGS. 6A-6E show steps of making a multicompartment capsule according to embodiments disclosed herein.

FIGS. 7A-7D show steps of making a multicompartment capsule according to embodiments disclosed herein.

FIG. 8A shows an apparatus for making multicompartment capsules according to embodiments disclosed herein. FIGS. 8B and 8C each show a group of compartments used to form a multicompartment capsule according to embodiments disclosed herein.

DETAILED DESCRIPTION

Figure 1A:
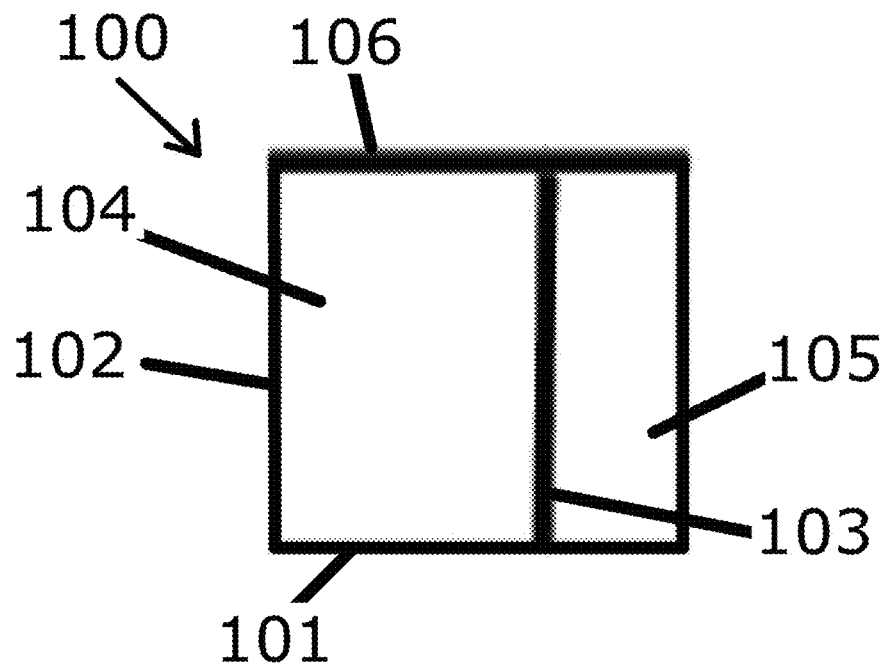
FIGS. 1A-1H are cross-sectional views of multicompartment capsules for use with a beverage forming apparatus according to embodiments disclosed herein.

Disclosed herein are embodiments of multicompartment capsules having extended shelf life. The multicompartment capsules disclosed herein are for use with beverage forming apparatuses that are operable to dispense a beverage having a predetermined aroma and/or taste and/or mouthfeel by combining fluid with one or more beverage formulations included in a respective multicompartment capsule to form the beverage having the predetermined aroma and/or taste and/or mouthfeel, which may then be dispensed by the beverage forming apparatus into a drinking vessel. Preferably, the multicompartment capsules include two or more beverage formulations therein wherein each respective beverage formulation is contained in a separate compartment of the multicompartment capsule. Preferably, the respective beverage formulations of the multicompartment capsules disclosed herein are contained in separate fluidly isolated compartments wherein each compartment is preferably hermetically sealed.

A beverage forming apparatus is preferably operable to access each compartment of a multicompartment capsule such that respective beverage formulations that are contained in the respective compartments can be combined with liquid supplied by the beverage forming apparatus to form a predetermined beverage that may be dispensed by the beverage forming apparatus. In an embodiment, the beverage forming apparatus can include a mixing unit that is operable to facilitate mixing between the supplied liquid and the respective beverage formulations. In an alternate embodiment, the beverage forming apparatus can be operable to dispense the fluid and respective beverage formulations of a multicompartment capsule into a drinking vessel such that the dispensed fluid and beverage formulations combine in the drinking vessel to form a beverage. In yet another embodiment, a multicompartment capsule as disclosed herein may be operable to facilitate mixing among two or more beverage formulations contained in separate compartments thereof with the liquid that is supplied by the beverage forming apparatus such that a beverage may be dispensed by the beverage forming apparatus.

In an embodiment, a beverage forming apparatus is operable to increase the pressure in an interior of one or more compartments of a multicompartment capsule such that a respective compartment of the multicompartment capsule can be opened (e.g., rupture) and a beverage formulation contained in the compartment may be combined with fluid supplied by the beverage forming apparatus, and/or one or more beverage formulations contained in other compartments of the multicompartment capsule. In an embodiment, liquid supplied to the interior of the multicompartment capsule, or a respective compartment of the multicompartment capsule, can cause the pressure therein to exceed a predetermined level such that the multicompartment capsule, or one or more compartments of the multicompartment capsule rupture, and thereby release a previously isolated beverage formulation. Alternatively, the beverage forming apparatus can include a gas supply component operable to increase the pressure in the interior of the multicompartment capsule or a respective compartment thereof such that pressure exceeds a predetermined level and the multicompartment capsule or a respective compartment thereof ruptures, and releases a beverage formulation that may be combined with liquid supplied by the beverage forming apparatus to make a predetermined beverage.

Flavor perception of a consumable product is defined as the combined impression of specific aroma, taste and trigeminal compounds along with entities that evoke mouth feel impressions (i.e. sensates) such as astringency, mouth coating, fullness, etc. Aroma compounds are volatiles that interact with olfactory receptors in the nose evoking a signal to the brain interpreted as smell, while the five basic tastes are elicited by interactions of tastants with specific taste receptors for salt, sweet, bitter, sour and umami tastes, respectively. Further, flavor perception includes characteristics of a consumable product, such as a color profile of a beverage, which can affect the flavor perception of the beverage. Flavor or beverage formulations (i.e., flavor systems, sensory mixtures, or beverage precursors) disclosed herein combine compounds to form a flavor perception of a predetermined beverage, such as a predetermined alcoholic beverage or a predetermined alcoholic mixed drink beverage. The beverage formulations can be a clear liquid, alcohol free, extract free, concentrate free, free of undissolved solids, and/or free of essential oils. Beverage formulations can include aroma compounds, taste compounds, and/or mouthfeel compounds that can be water soluble. The compounds, such as aroma compounds, can also be soluble in an alcohol such as ethanol. Beverage formulations can also include colorants that are used to enhance the appearance and thereby the flavor perception of a beverage formed by a beverage forming apparatus.

In general, out of the many hundreds of chemical entities that are found in natural products, especially those of agricultural origin that may also have been subjected to additional fermentation or prolonged storage, only an order of ten chemical entities may be responsible for aroma, taste and mouth feel. Isolation and chemical analysis techniques allow for the identification and quantification of flavor compounds out of the many hundreds that may be detected in a fermented and/or brewed alcoholic beverage.

A flavor that mimics the sensory attributes of a certain product by using the same or similar flavor relevant compounds of the natural product is called "nature craft identical" and the combination of chemical entities that mimic the natural product is called a "nature craft recombinant". Recombinants may be altered or new compounds may be added thereto to create new superior flavors, or to compensate for flavor compounds that cannot be used because they are not generally recognized as safe (GRAS) or pose availability issues. Through omissions and/or additions of certain compounds in our "recombinants", important interplays between aroma, flavor, and mouthfeel impressions can be determined and used to create the best possible nature craft identical product as outlined in commonly-assigned U.S. Patent Application Publication No. 2014/0272019 and commonly-assigned U.S. Patent Application Publication No. 2014/0272006, the entire content of each of which is incorporated herein by this reference thereto. The recombinants can be used as constituents of a beverage formulation that can be contained in a capsule of a beverage forming apparatus wherein the beverage forming apparatus can form beverages having a predetermined aroma and/or taste and/or mouthfeel, such as the aroma and/or taste and/or mouthfeel of an alcoholic beverage, when the beverage formulation is combined with an alcoholic fluid.

To form a beverage formulation that has a predetermined aroma and/or taste and/or mouthfeel, the beverage formulation can include at least one flavor compound from one or more of each of the following groups: (1) Cheesy, Sweaty Flavor Group, (2) malty, Buttery and/or Sweet Flavor Group, (3) Floral and/or Honey Flavor Group, (4) Fruity Flavor Group, (5) Smoky, Coconut, Woody Flavor Group, (6) Cooked, Seasoning, Fatty Flavor Group, (7) Phenolic/Medicinal Flavor Group, (8) Sour Taste Group, (9) Sweet Taste Group, (10) Salty and Bitter Taste Group, (11) Astringent, Mouthfeel Group, (12) Bitter Taste Group and/or (13) Umami Taste and Mouthfeel Group.

However, certain compounds of the aforementioned groups used to form beverage formulations which are required to achieve a predetermined aroma and/or taste and/or mouthfeel of a beverage are reactive, and therefore, chemical reactions between those reactive compounds can compromise the shelf life of a beverage formulation contained in a capsule. Further, these reactions cause the taste of a beverage formed from a respective beverage formulation to deteriorate over time. For example, hydrolysis, oxidation or condensation reactions for compounds containing acid, hydroxyl or aldehyde functionalities can take place in beverage formulations. These reactions may also be catalyzed by the pH of the beverage formulation contained within a capsule. For example, it has been observed that specific aroma compounds are susceptible to losses especially under low pH conditions such as when the specific aroma compounds are included in a low pH aqueous environment. On the other hand, most taste compounds are soluble in water and are stable at low pH. Therefore, if certain aroma compounds included in a beverage formulation are subjected to low pH conditions, those aroma compounds will decrease, such as within a timeframe of about a few days to a few weeks, and the taste of a beverage formed from the beverage formulation will deteriorate over time. As such, the shelf life of a capsule for use with a beverage forming apparatus that includes a beverage formulation which contains aroma compounds that are susceptible to losses when subjected to low pH conditions will be limited, and may not be commercially acceptable. Therefore, capsules and beverage formulations with extended shelf lives are desirable.

Therefore, a multicompartment capsule can provide an increased shelf life of a beverage formulation having a predetermined aroma and/or taste and/or mouthfeel when the reactive compounds of the beverage formulation are segregated into nonreactive groups, and the nonreactive groups are provided in separate compartments of the multicompartment capsule. The segregated compounds can be provided in a stable form in the separate compartments of the multicompartment capsule such that chemical reactions are minimized, and losses of certain compounds are minimized. Thus, the segregation of the reactive compounds in separate compartments of a multicompartment capsule increases the shelf life of the multicompartment capsule while providing a beverage formulation having the predetermined aroma and/or taste and/or mouthfeel when the segregated compounds are later combined in a beverage forming apparatus with fluid, during formation of a beverage.

For example, according to an embodiment disclosed herein, an extended shelf life multicompartment capsule can include at least a first compartment that is isolated from a second compartment wherein the first compartment includes a first beverage formulation containing aroma compounds and the second compartment includes a second beverage formulation containing taste and/or mouthfeel compounds. Thus, the aroma compounds can be prevented from being subjected to low pH aqueous environments in which the taste compounds are readily soluble and stable. Rather, the aroma compounds can be in ethanol in the first compartment, which provides a more stable environment for the aroma compounds than water. Thus, by segregating aroma compounds in a first beverage formulation from taste compounds in a second beverage formulation in separate, fluidly isolated compartments of a multicompartment capsule, the shelf life of the first and second beverage formulations, and thereby the shelf life of the multicompartment capsule is increased. The first and second beverage formulations may later be combined with fluid supplied by a beverage forming apparatus to form a beverage having a predetermined aroma and/or taste and/or flavor which does not deteriorate as readily over time. In this embodiment, aroma compounds from each of the following groups (1) Cheesy, Sweaty Flavor Group, (2) Malty, Buttery and/or Sweet Flavor Group, (3) Floral and/or Honey Flavor Group, (4) Fruity Flavor Group, (5) Smoky, Coconut, Woody Flavor Group, (6) Cooked, Seasoning, Fatty Flavor Group, and (7) Phenolic/Medicinal Flavor Group, can be included in a first ethanol based beverage formulation that is isolated in a first compartment of a multicompartment capsule whereas taste/mouthfeel compounds from each of the following groups (8) Sour Taste Group, (9) Sweet Taste Group, (10) Salty and Bitter Taste Group, (11) Astringent, Mouthfeel Group, (12) Bitter Taste Group and/or (13) Umami Taste and Mouthfeel Group, can be included in a water based second beverage formulation that is isolated in a second compartment of the multicompartment capsule such that the multicompartment capsule has an extended shelf life, and can form a beverage formulation having a predetermined aroma and/or taste and/or mouthfeel when the first ethanol based beverage formulation is combined with the second water based beverage formulation, and fluid supplied by a beverage forming apparatus.

In a further embodiment, a beverage formulation can further include additional ingredients such as fruit juice or sugar for forming alcoholic beverages such as cocktails from beverage forming apparatuses. In a first embodiment, the additional ingredients can be included with the taste and/or mouthfeel compounds in the second water based beverage formulation. However, the sugar or fruit juice may react with some of the taste and/or mouthfeel compounds, and therefore lead to reduced shelf life of the multicompartment capsule. Therefore, in a second embodiment, the sugar or fruit juice can be included in a third beverage formulation that is contained in a third compartment of the multicompartment capsule, such that the multicompartment capsule has an increased shelf life. In yet a further embodiment, compounds can be segregated into one or more ethanol based beverage formulations and one or more water based beverage formulations depending on whether the specific compound is more stable in water or ethanol, and depending on the reactivity of the respective compounds that are to be included in water, or the reactivity of the respective compounds that are to be included in ethanol. Additionally, the respective compartments in which the beverage formulations are included in are preferably hermetically sealed compartments so as to prevent loss of compounds such as volatile aroma compounds. Preferably, the multicompartment capsules and compartments thereof also provide a barrier to oxygen and water vapor, to further maintain the freshness of the beverage formulations contained therein. For example, the multicompartment capsules and compartments may preferably be constructed of metal (aluminum), and/or a multi-layer (metal/plastic) material, such as one or more layers of polymer material and metal film, in order to provide suitable barrier performance to oxygen and water vapor.

In addition to, or alternative to, using separate compartments to fluidly isolate reactive compounds of liquid beverage formulations, compounds used to form a beverage formulation can be in dry form or gel form, and/or encapsulated so as to separate the compounds on a micro-level. For example, encapsulation of certain compounds could isolate aroma compounds from the rest of the compounds that contribute to a low pH. The encapsulated compounds could be mixed in a single compartment capsule thereby resulting in a solid dispersion or suspension. In a preferred embodiment, however, the encapsulated compounds are separated in different compartments of a multicompartment capsule. The contents of the encapsulated compounds could be released by different activation mechanisms, such as by heat (i.e., introducing hot water from the beverage forming apparatus), or alcohol dissolution by the alcohol mixture supplied by a beverage forming apparatus to form an alcoholic beverage. In an embodiment, aroma compounds can be adsorbed onto an adsorbent in order to be protected by the low pH and released via desorption by the added water and alcohol when making a beverage. In another embodiment, the beverage formulation can be a gel or fluid gel which immobilizes flavor compounds and slow down interactions that lead to reduced shelf life. Suitable encapsulating matrices may be composed of dextrin, biopolymers, and the like.

The beverage formulations of the multicompartment capsules can be mixed with a fluid or liquid base, by the beverage forming apparatus, which is preferably a mixture of water and an alcohol, such as ethanol or vodka, to create an alcoholic beverage having the aroma and/or taste and/or mouthfeel of beverages such as beer, wine, sparkling wine, cider, whiskey, gin, vermouth, rum, tequila, and/or an alcoholic mixed drink (i.e. a cocktail), but without fermentation, distillation, brewing and/or other costly and time consuming measures (for example aging) associated with the production of beers, wines, sparkling wines, ciders, whiskeys, gins, vermouths, rums, or tequilas. The vodka or ethanol and water mixtures used to form a respective alcoholic beverage are preferably flavorless or have a neutral flavor, so as not to alter or detract from the aroma and/or taste and/or mouthfeel imparted by a beverage formulation when combined with the vodka or ethanol and water mixture. In an alternative embodiment, the beverage formulation can be combined with a low flavor beer, wine, sparkling wine, cider, whiskey, gin, vermouth, rum, and/or tequila to create a superior beer, wine, sparkling wine, cider, whiskey, gin, vermouth, rum, tequila, and/or an alcoholic mixed drink (i.e. cocktail) flavored beverage.

The beverage formulations included in the respective compartments of the multicompartment capsules disclosed herein are preferably in amount sufficient to form a single serving beverage having an alcohol content ranging from about 0.1% alcohol by volume to about 90% alcohol by volume. For example, wine can have an alcohol content of about 0.1% alcohol by volume to about 25% alcohol by volume, whiskey, or other liquors, can have about 40% (or lower) alcohol by volume to about 70% alcohol by volume, and beer can have about 2% alcohol by volume to about 20% alcohol by volume. The amount of alcohol in a liquid containing alcohol that is supplied by the beverage forming apparatus and combined with respective beverage formulations can be selected based on the type of beverage being formed and/or can be controlled by a controller of a beverage forming apparatus if an adult consumer wishes to have a beverage having a lower alcohol content than that contemplated when a respective multicompartment capsule for the preparation of a desired alcoholic beverage is formed. For example, a low alcohol or alcohol free beer can be dispensed from the beverage forming apparatus which has the flavor of a beer which may traditionally have a higher alcoholic content if traditionally brewed. Embodiments of beverage formulations can be found in commonly-assigned U.S. Patent Application Publication No. 2016/0073673, which is hereby incorporated herein by reference in its entirety. Embodiments of beverage forming apparatuses that can be used to form beverages from beverage formulations can be found in commonly-assigned U.S. patent application Ser. No. 15/078,608, which is hereby incorporated herein by reference in its entirety.

The multicompartment capsules disclosed herein can be thermoformed, injection molded, or blow molded. Preferably, the compartments of the multicompartment capsules are thermoformed. The thermoforming can include vacuum forming, or vacuum forming with a plug assist. The material forming the multicompartment capsules can be one or more layers of polymer material such as polyethylene (PE), polyethylene terephthalate glycol-modified (PETG), polypropylene (PP), polystyrene, polyethylene teraphalate (PET), Polyvinylidene chloride (PVdC), Ethylene vinyl alcohol (EVOH), Polytetrafluoroethylene (PTFE), Polychlorotrifluoroethylene (PCTFE), or Acrylonitrile-Methyl acrylate copolymer, further including one or more optional layers of metal foil or film. In an embodiment, a multicompartment capsule has a multilayer construction of respective layers of PET/EVOH/PET, PET/PVDC/PET, PP/PVDC/PET, PP/PVDC/PET, or PET/PTFE/PET, with one more layers of metal foil or film included therein. In an alternate embodiment, the multicompartment capsule has a multilayer construction of polymer material without any layers of metal.

The openings of respective compartments of the multicompartment capsules can be sealed by one or more lids formed of the same or different material as a respective multicompartment capsule. For example, the lid can be a foil material, such as aluminum foil, or have a multilayer construction of one or more layers of polymer material and one or more layers of metal foil or film. Preferably, the multicompartment capsule and lid are formed from a single sheet of the same material, wherein the material used to form the multicompartment capsule and lid is recyclable. For example, the multicompartment capsule and lid can be formed of PET, preferably a single sheet of PET, wherein the multicompartment capsule can be recycled without an individual having to remove the lid from the multicompartment capsule after the multicompartment capsule has been used to form a beverage. The lid, as well as other mating surfaces of the multicompartment capsules as disclosed herein, can be sealed together with an adhesive, or by ultrasonic welding, heat sealing, welding, or other suitable means during formation thereof.

FIGS. 1A-1H illustrate cross sections of multicompartment capsules 100 according to embodiments disclosed herein. The multicompartment capsules 100 can be inserted into a beverage forming apparatus such that the beverage forming apparatus can form and dispense a predetermined beverage by supplying and mixing (combining) fluid with two or more beverage formulations contained in separate compartments of the multicompartment capsules 100. The combined fluid and beverage formulations are then dispensed by the beverage forming apparatus into a vessel, such as a drinking vessel to form the predetermined beverage. The multicompartment capsules 100 include a base 101 and a sidewall 102 extending upwardly from the base. The base 101 can be any shape such as, but not limited to, a circular, oval, or rectangular shape. In an embodiment, the base 101 can be contoured or include one or more ridges or ribs. The sidewall 102 can extend upwardly (see FIGS. 1A, 1B, 1E, 1F), such as a tubular sidewall, or can be an upwardly and outwardly extending sidewall (see FIGS. 1C, 1D 1G, 1H), such as a frustoconical sidewall that extends upwardly and outwardly. The rate at which the upwardly and outwardly extending sidewall extends outwardly can be constant or vary along the upwardly extending length thereof. Further, the sidewall 102 can be a contoured sidewall 102 that includes one or more upwardly extending portions, one or more outwardly extending portions, and/or one or more upwardly and outwardly extending portions. Preferably the base 101 and sidewall 102 are integrally formed from a single sheet of material, which may having one or more layers. In an alternative embodiment, the base 101 can be formed of foil, or a material different than the sidewall 102. An inner surface of the sidewall 102 can also include one or more ridges or ribs to provide structural integrity for the multicompartment capsule 100 and/or facilitate mixing of fluid supplied by a beverage forming apparatus and the beverage formulations.

The sidewall 102 forms an opening at an upper end thereof, which can be sealed by a lid 106, so at to form a sealed multi-compartment capsule 100. Preferably, the sidewall 102 forms a rim 113 (see FIGS. 1C-1H), around the opening thereof such that an upper surface of the rim 113 can be sealed to a lower surface of the lid 106. The respective compartments of the multicompartment capsules 100 can each include a respective beverage formulation therein, wherein a respective multicompartment capsule 100 can be inserted into a beverage forming apparatus that is operable to open the respective compartments of a multicompartment capsule 100 and combine the respective beverage formulations with fluid supplied by the beverage forming apparatus so as to form a beverage that may be dispensed from the beverage forming apparatus.

FIGS. 1A-1H illustrate embodiments of one or more partitions 103 or 114 that can divide the interior of a multicompartment capsule 100 so as form respective fluidly isolated compartments of the multicompartment capsule 100. The fluidly isolated compartments of a respective multicompartment capsule 100 isolate respective beverage formulations contained therein such that the respective beverage formulations do not mix until the multicompartment capsule 100 is inserted into a beverage forming apparatus that is operable to form a beverage therefrom, or an individual physically opens the compartments and combines the beverage formulations. Preferably, the one or more partitions 103 hermetically seal or substantially hermetically seal the respective compartments from each other so as to prevent vapor or volatile compounds that may be included in a respective beverage formulation from migrating into an adjacent compartment of the multicompartment capsule 100, or escaping into the atmosphere.

For example, as shown in FIG. 1A, a vertical partition 103 extends from the base 101 to the lid 106 of the multicompartment capsule 100 so as to horizontally separate a first compartment 104 from a second compartment 105 of the multicompartment capsule 100. The multicompartment capsule 100 of FIG. 1A can be inserted into a beverage forming apparatus wherein the beverage forming apparatus can include two or more liquid supplying piercing elements wherein a respective liquid supplying piercing element of the beverage forming apparatus can be inserted through the lid 106 or an upper portion of the sidewall 102 of the multicompartment capsule 100 so as to enter each respective compartment of the multicompartment capsule 100 and supply liquid thereto through a respective orifice of each liquid supplying piercing element. Thus, the supplied liquid combines with a beverage formulation included in the respective compartments of the multicompartment capsule 100.

For example, a first liquid supplying piercing element can enter the first compartment 104 and supply liquid into the first compartment 104 through an orifice thereof such that the liquid combines with a first beverage formulation contained in the first compartment 104. A second liquid supplying piercing element can enter the second compartment 105 and supply liquid into the second compartment 105 through an orifice thereof such that the liquid combines with a second beverage formulation contained in the second compartment 105. In a further embodiment, the beverage forming apparatus can include one liquid supplying piercing element that is operable to pierce the lid 106 or sidewall 102 of the multicompartment capsule 100 and supply liquid to an interior of a respective compartment thereof at a pressure sufficient to cause the vertical partition 103 to burst such that a first beverage formulation in the first compartment 104 combines with a second beverage formulation in the second compartment 105 and the supplied fluid. In an embodiment, the vertical partition 103 can include a weakened portion which is operable to rupture after a predetermine pressure has been attained in a respective compartment of the multicompartment capsule 100.

Likewise, the beverage forming apparatus can include two or more dispensing piercing elements that can be inserted through the base 101 or a lower portion of the sidewall 102 of the multicompartment capsule 100 such that the liquid supplied to the respective compartments which has combined with the respective beverage formulations in the compartments may be dispensed by the beverage forming apparatus. The combined liquid and beverage formulations can be dispensed through respective orifices of the two or more dispensing piercing elements, or alternatively through respective openings in the multicompartment capsule 100 formed by the two or more dispensing piercing elements. In an embodiment, the beverage forming apparatus can include a mixing unit, wherein the respective beverage formulations, which have combined with the supplied fluid, can then combine in the mixing unit and subsequently be dispensed by the beverage forming apparatus. Alternatively, the respective beverage formulations, which have been combined with the supplied fluid can be individually dispensed into and combined within a drinking vessel. Alternatively, the sidewall 102 can be inwardly compressed by the beverage forming apparatus such that each compartment ruptures, thereby releasing a beverage formulation therein.

Figure 1B:
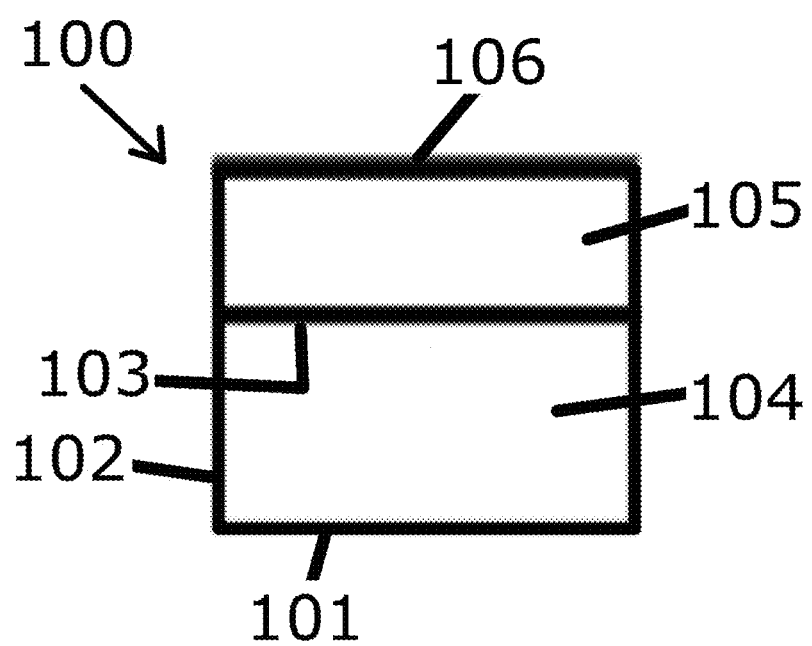

As shown in FIG. 1B, a horizontal partition 103 can extend horizontally such that an outer perimeter thereof is sealed to the sidewall 102 so as to fluidly isolate, and preferably hermetically seal, a first compartment 104 from a second compartment 105. The multicompartment capsule 100 of FIG. 1B can be inserted into a beverage forming apparatus wherein the beverage forming apparatus includes at least one liquid supplying piercing element wherein the liquid supplying piercing element can be inserted through the lid 106 and the horizontal partition 103 of the multicompartment capsule 100 so as to pass through the second compartment 105, enter the first compartment 104 and supply liquid thereto. In an embodiment, the at least one piercing element can pierce the partition 103 such that a second beverage formulation included in the second compartment 105 enters the first compartment 104 and combines with a respective first beverage formulation in the first compartment and the liquid supplied to the first compartment 104 by the liquid supplying piercing element.

Alternatively, a liquid supplying piercing element of the beverage forming apparatus can be operable to pierce the horizontal partition 103 so as to enter the first compartment 104, and then retract so as to form an opening in the horizontal partition 103. The liquid supplying piercing element can supply liquid to the interior of the second compartment 105 such that the supplied liquid combines with a second beverage formulation in the second compartment. The supplied liquid which has combined with the second beverage formulation is then combined with a first beverage formulation in the first compartment 104 through the opening in the horizontal partition 103. In a further embodiment, the beverage forming apparatus can be operable to pierce the lid 106 of the multicompartment capsule 100 and supply liquid to an interior of the second compartment 105 at a pressure sufficient to cause the horizontal partition 103 to burst such that a first beverage formulation in the first compartment 104 can combine with a second beverage formulation in the second compartment 105 and the supplied fluid. In an embodiment, the horizontal partition 103 can include a weakened portion which is operable to rupture after a predetermine pressure has been attained in the second compartment 105 of the multicompartment capsule 100.

Likewise, the beverage forming apparatus can include at least one dispensing piercing element that can be inserted through the base 101 or a lower portion of the sidewall 102 of the multicompartment capsule 100 such that the liquid supplied to the respective compartments which has combined with the respective beverage formulations in the compartments may be dispensed by the beverage forming apparatus. The combined liquid and beverage formulations can be dispensed through a respective orifice of the at least one dispensing piercing element, or alternatively through a respective opening in the multicompartment capsule 100 formed by the at least one dispensing piercing element. In an embodiment, the beverage forming apparatus can include a mixing unit, wherein the respective beverage formulations, which have been combined with the supplied fluid, can be combined in the mixing unit and subsequently dispensed from the beverage forming apparatus. Alternatively, the respective beverage formulations, which have been combined with the supplied fluid, can be individually dispensed into and combined in a drinking vessel.

Figure 1C:
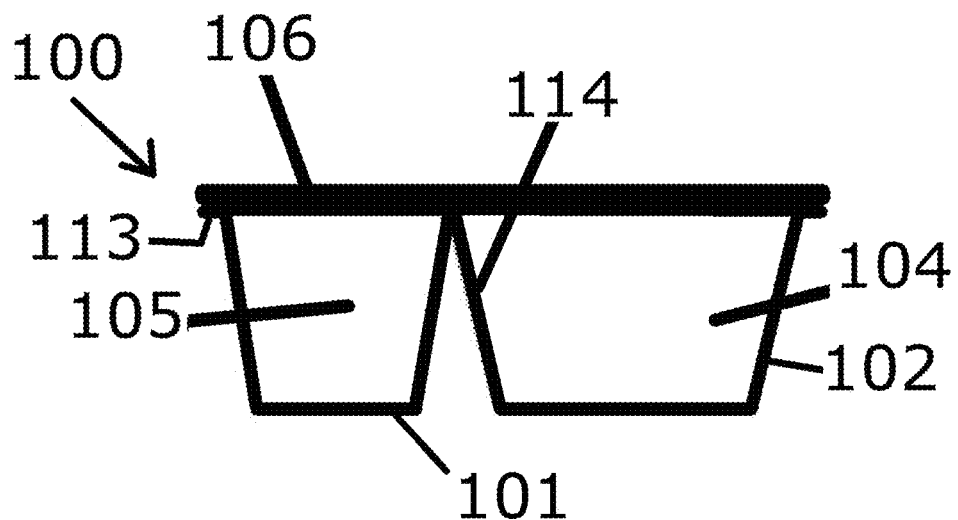
Figure 1D:
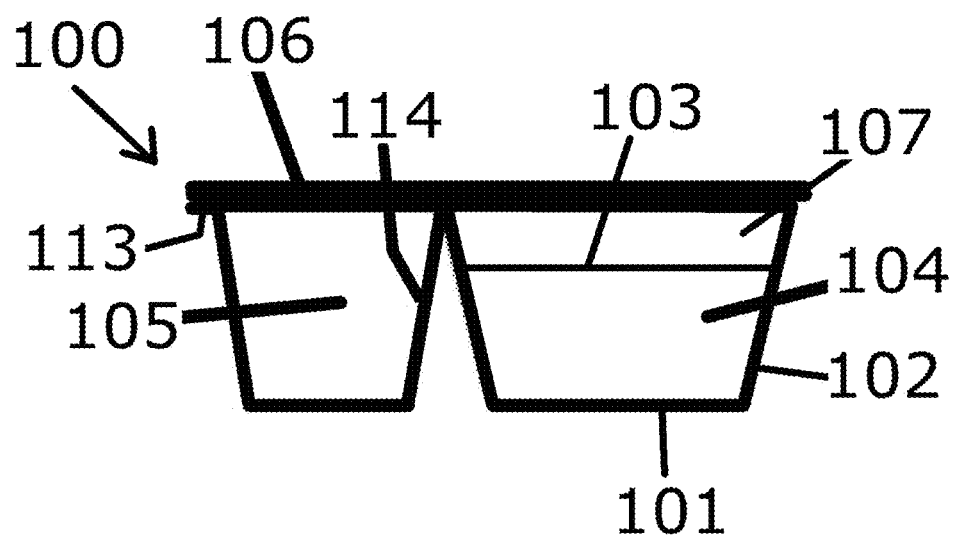

In an embodiment, as shown in FIGS. 1C and 1D, a multicompartment capsule 100 can include an upwardly extending portion 114, that extends upwardly from the base 101 such that the upwardly extending portion 114 can be sealed to a lid 106 of the multicompartment capsule 100 so as to form a partition that fluidly isolates, and preferably hermetically seals, a first compartment 104 containing a first beverage formulation from a second compartment 105 containing a second beverage formulation. Additionally, the sidewall 102 can include a rim 113 at an upper end thereof, which can be sealed to the lid 106. Further, the first or second compartment 104, 105 can include a partition 103 therein (see FIG. 1D), such as a horizontal or vertical partition, so as to form a third compartment 107 of the multicompartment capsule 100, which contains a third beverage medium. The multicompartment capsule 100 can be inserted in a beverage forming apparatus which is operable to combine the respective beverage formulations included in the compartments of the multicompartment capsule 100 with liquid supplied thereby, such that a beverage may be dispensed by the beverage forming apparatus. The beverage forming apparatus can include a mixing unit that is operable to combine the respective beverage formulations and fluid, or alternatively, the respective beverage formulations, which have been combined with the supplied fluid, can be dispensed into and combined in a drinking vessel.

Figure 1E:
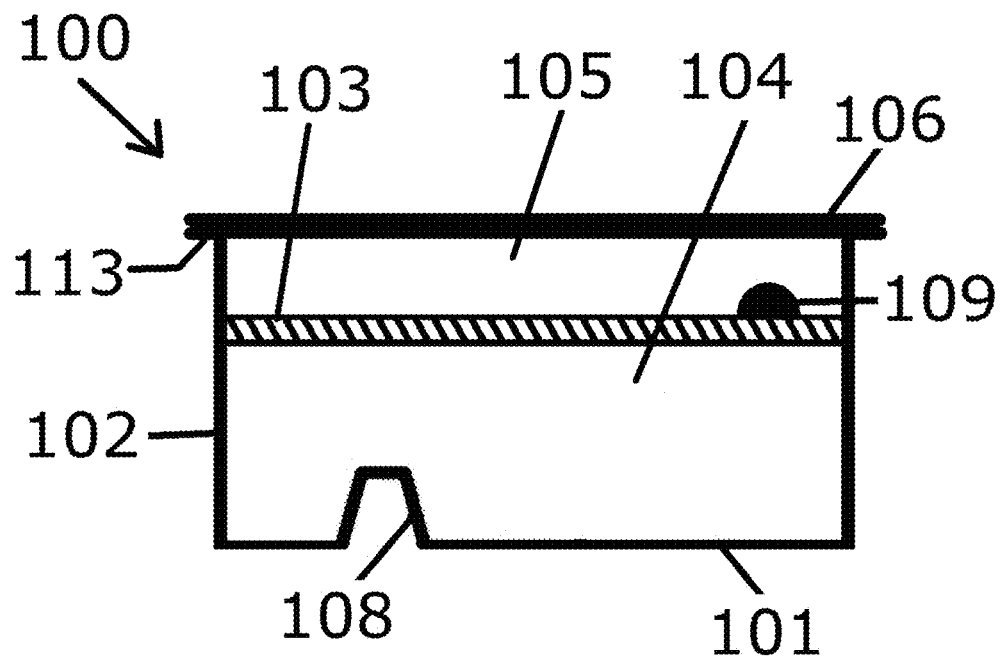
Figure 1F:
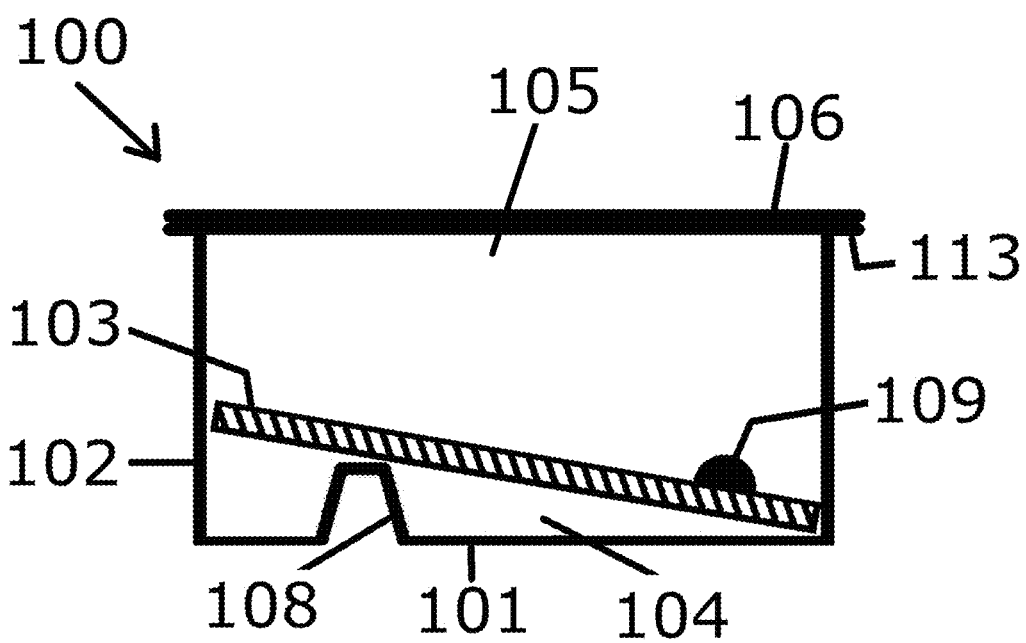

FIGS. 1E and 1F illustrate an alternate embodiment of a partition 103 that can fluidly isolate, and preferably hermetically seal, a first compartment 104 from a second compartment 105 of a multicompartment capsule 100. FIG. 1E shows the multicompartment capsule 100 having a partition 103 in a sealed position whereas FIG. 1F shows the multicompartment capsule 100 in open position wherein the partition 103 has been detached such that beverage formulations separated by the partition 103 may be combined. The multicompartment capsule 100 shown in FIG. 1E can be inserted into a beverage forming apparatus wherein the beverage forming apparatus is operable to pierce a lid 106 of the multicompartment capsule 100 and supply liquid thereto. In an embodiment, the liquid supplying piercing element is operable to contact and urge the partition 103 such that the partition 103 is detached from a sidewall 102 of the multicompartment capsule 100 such that a first beverage formulation included in the first compartment 104 can be combined with a second beverage formulation included in the second compartment 105, and liquid supplied through an orifice of the liquid piercing element. Alternatively, the liquid supplying piercing element is operable to pierce the lid 106 of the multicompartment capsule 100 and supply liquid at a pressure sufficient to detach the partition 103 such that a first beverage formulation included in the first compartment 104 can be combined with a second beverage formulation included in the second compartment 105 and liquid supplied through an orifice of the liquid piercing element.

The beverage forming apparatus can include at least one dispensing piercing element that can be inserted through a base 101 or a lower portion of the sidewall 102 of the multicompartment capsule 100 such that the liquid supplied to the respective compartments which has combined with the respective beverage formulations in the compartments may be dispensed by the beverage forming apparatus. The dispensing piercing element can include an orifice such that liquid is dispensed therethrough. Alternatively, the dispensing piercing element can form an opening (outlet) in the base 101 of the multicompartment capsule 100 such that the combined beverage formulations and liquid can be dispensed therethrough. In an embodiment, the beverage forming apparatus can include a mixing unit, wherein the respective beverage formulations and supplied fluid can be combined therein and subsequently dispensed from the beverage forming apparatus. Alternatively, the respective beverage formulations, may be individually combined with the supplied fluid, and individually dispensed into and combined in a drinking vessel.

In an embodiment, as shown in FIGS. 1E and 1F, the multicompartment capsule 100 can include at least one protrusion 108 that extends upwardly from the base 101 that forms a fulcrum that causes the detached partition 103 to pivot so as to facilitate mixing between a first beverage formulation in the first compartment 104 with a second beverage formulation in the second compartment 105 and the liquid supplied by the liquid supplying piercing element. Additionally, the at least one protrusion 108 is operable to keep the detached partition 103 from obstructing a dispensing opening (outlet) formed in the multicompartment capsule 100 by the dispensing piercing element or an orifice of the dispensing piercing element through which the combined beverage formulations and liquid are dispensed. In a preferred embodiment, the partition 103 can include a counterweight 109, or uneven distribution of mass, arranged so as to increase the pivoting action of the partition 103 about the protrusion 108 that forms the fulcrum.

Figure 1G:
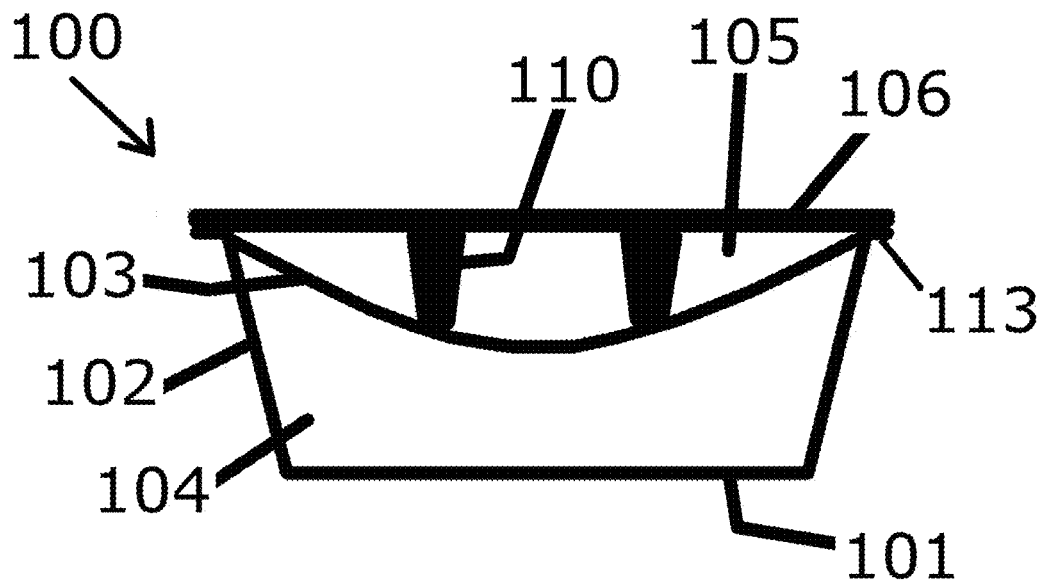

In an embodiment as shown in FIG. 1G, a lid 106 of a multicompartment capsule 100 can include one or more puncture elements 110. In this embodiment, when the multicompartment capsule 100 is inserted into a beverage forming apparatus and the lid 106 of the multicompartment capsule 100 is pierced by a respective liquid supplying piercing element of the beverage forming apparatus, the one or more puncture elements 110 are urged downwardly so as to puncture through a partition 103 that fluidly separates, and preferably hermetically seals, a first compartment 104 containing a first beverage formulation from a second compartment containing a second beverage formulation. When the partition 103 is punctured, the first beverage formulation combines with the second beverage formulation and liquid supplied through an orifice of the liquid supplying piercing element. The combined beverage formulations and liquid may be subsequently dispensed through an orifice of a dispensing piercing element inserted through the base 106 or sidewall 102 of the multicompartment capsule 100 or an opening formed in the base 101 or sidewall 102 of the multicompartment capsule 100 by the dispensing piercing element. In an embodiment, the partition 103 can be a flexible material, or material that is easily punctured.

Figure 1H:
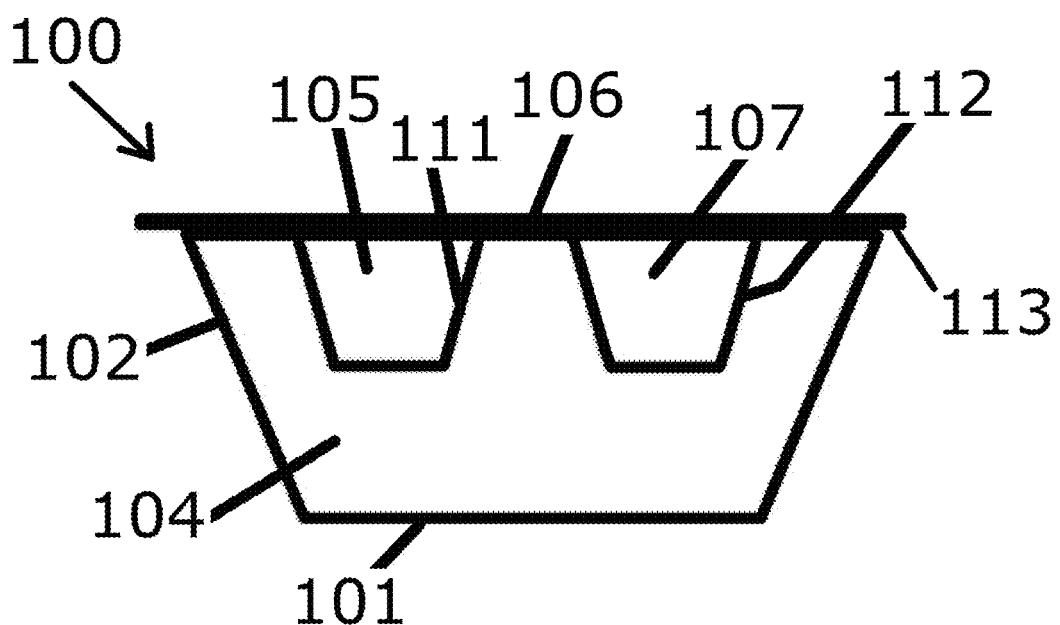

In an embodiment as shown in FIG. 1H, a first cup 111 and a second cup 112 can be sealed to a lower surface of a lid 106 of the multicompartment capsule 100 such that at least one cup is suspended in an interior of a first compartment 104 of the multicompartment capsule 100. Preferably, respective first and second cups 111, 112 are sealed to the lower surface of the lid 106 and suspended in the interior of the first compartment 104 of the multicompartment capsule 100. In a further embodiment, three or more cups can be sealed to the lower surface of the lid 106 and suspended in the interior of the first compartment 104. The respective cups can be any shape. The first compartment 104 preferably includes a first beverage formulation therein. The first cup 111 forms a respective second compartment 105 of the multicompartment capsule 100 that contains a second beverage formulation therein, and the second cup 112 forms a respective third compartment 107 of the multicompartment capsule 100 that contains a third beverage formulation therein.

In an embodiment, the first compartment 104 may not include a beverage formulation therein such that the first compartment 104 may form a mixing chamber for a first beverage formulation contained in the first cup 111, a second beverage formulation contained in the second cup 112, and liquid supplied by the beverage forming apparatus when the first cup 111 and the second cup 112 are opened by the beverage forming apparatus and release respective beverage formulations into the first compartment 104. Alternatively, a second beverage formulation contained in the first cup 111 and a third beverage formulation contained in the second cup 112 can be combined with a first beverage formulation contained in the first compartment 104 and fluid supplied by the beverage forming apparatus.

In an embodiment, the multicompartment capsule 100 as illustrated in FIG. 1H can be inserted into a beverage forming apparatus that includes a single liquid supplying piercing element that is operable to pierce each of the first, second, and third compartments 104, 105, 107 such that liquid supplied by the liquid supplying piercing element can be combined with a first beverage formulation contained in the first compartment, a second beverage formulation contained in the first cup 111, and third beverage formulation contained in the second cup 112. In this embodiment, the single liquid supplying piercing element can be inserted through a sidewall 102 of the multicompartment capsule 100 and then subsequently through a sidewall of each cup suspended from the lid 106 of the multicompartment capsule.

Alternatively, the beverage forming apparatus an include at least two liquid supplying piercing elements. In this embodiment, a first and second liquid supplying piercing element can be inserted through the lid 106 of the multicompartment capsule 100 such that the respective liquid supplying piercing elements pierce a base of the respective first and second cups 111, 112. In this manner the respective beverage formulations contained in the respective cups 111, 112 may be released into the interior of the first compartment 104. The liquid supplying piercing elements can pierce the respective bases of the first and second cups 111, 112, thereby releasing the respective beverage formulation into the interior of the first compartment 104 while fluid is supplied by the liquid supplying piercing elements directly into the interior of the first compartment 104. Alternatively, the beverage forming apparatus may be operable to cause the respective liquid supplying piercing elements to retreat back into the respective second compartment 105 formed by the first cup 111 and the third compartment 107 formed by the second cup 112 after piercing the respective bases of the first and second cups 111, 112 such that the respective liquid supplying piercing elements supply liquid directly into the respective interiors of the first cup 111 and second cup 112. The fluid supplied into the respective interiors of the first cup 111 and second cup 112 may combine with the respective beverage formulations and be released through the formed openings of the first and second cups 111, 112 such that the fluid and beverage formulations combine with a first beverage formulation contained in the first compartment 104. Further, the respective liquid supplying piercing elements may supply liquid in a manner that forces the respective beverage formulations through the formed openings and facilitates mixing between the fluid and respective beverage formulations.

In an embodiment, the first and second liquid supplying piercing elements can be inserted through the lid 106 of the multicompartment capsule such that the first liquid supplying element enters the interior of, but does not pierce the base of the first cup 111, and the second liquid supplying element enters the interior of, but does not pierce the base of the second cup 112. In this embodiment, the first and second liquid supplying piercing elements are operable to supply fluid at a pressure sufficient to cause the first and second cups 111, 112 to rupture and release their respective beverage formulations combined with liquid supplied by the respective liquid supplying piercing elements to the interior of the first compartment 104, such that the respective beverage formulations may be combined with the first beverage formulation contained in the interior of the first compartment 104. In this embodiment, the first and second cups 111, 112 preferably include a weakened portion of reduced thickness, or a partially-perforated region that is operable to rupture after a sufficient pressure has been reached in the respective interiors thereof.

In a further embodiment, a third liquid supplying piercing element can be inserted through the lid 106 or sidewall 102 so as to also supply fluid directly into the interior of first compartment 104. In each of the aforementioned embodiments, one or more dispensing piercing elements can enter the base 101 or sidewall 102 of the multicompartment capsule 100 such that a beverage may be dispensed therefrom.

Still referring to FIG. 1H, in an further embodiment, a single liquid supplying piercing can be inserted through the lid 106 or sidewall 102 of the multicompartment capsule 100 wherein the single liquid supplying piercing element can supply liquid directly into the interior of the first compartment 104 which mixes with a first beverage formulation in the first compartment 104. In this embodiment, the beverage forming apparatus can include two dispensing piercing elements that are operable to pierce the base 101 of the multicompartment capsule 100, and subsequently the respective bases of the first and second cups 111, 112. After the bases of the first and second cups 111, 112 have been pierced, the respective dispensing piercing elements may be retracted back through the openings such that a second beverage formulation in the first cup 111, and a respective third beverage formulation in the second cup 112 may be released through the formed openings and combine with the fluid and first beverage formulation in the interior of the first compartment 104. The combined beverage formulations and fluid may then be dispensed into a drinking vessel through respective orifices of the retracted dispensing piercing elements or alternatively, the dispensing piercing elements may be retracted completely from the interior of the first compartment 104 and a beverage can be dispensed through the respective openings formed by the dispensing piercing elements into a drinking vessel.

FIGS. 2A-2F illustrate cross sections of further embodiments of multicompartment capsules 200 that can be inserted into a beverage forming apparatus to thereby form and dispense a predetermined beverage. The multicompartment capsules 200 include a base 201 and a sidewall 202 extending upwardly from the base 201. The base 201 can be any shape such as, but not limited to, a circular, oval, or rectangular shape. In an embodiment, the base 201 can be contoured or include one or more ridges. In an embodiment, the sidewall 202 can include a first portion 202a that extends upwardly and outwardly from the base 201, a second portion 202b that extends upwardly from an upper end of the first portion 202a, and a third portion 202c that extends upwardly and outwardly from an upper end of the second portion 202b (see FIGS. 2A, 2B, 2C, 2D). In an alternate embodiment, the sidewall 202 can extend upwardly from the base 201 along a first portion, and then upwardly and outwardly from an upper end of the first portion along a second portion thereof (See FIG. 2E, 2F). The rates at which the upwardly and outwardly extending portions of the sidewall 202 extend outwardly can be constant or vary along the upwardly extending lengths thereof. Further, the sidewall 202 is not limited to the embodiments illustrated in FIGS. 2A-2F, and can be a contoured sidewall 202 that includes one or more upwardly extending portions, one or more outwardly extending portions, and/or one or more upwardly and outwardly extending portions.

The sidewall 202 forms an opening at an upper end thereof, which can be sealed by a lid 206, so as to form a sealed multi-compartment capsule 200. Preferably, the sidewall 202 forms a rim 213 (see FIGS. 2A-2F), around the opening thereof such that an upper surface of the rim 213 can be sealed to a lower surface of the lid 206. The respective compartments of the multicompartment capsules 200 are fluidly isolated by one or more thermally detachable partitions 203. Each compartment can include a respective beverage formulation therein, wherein a respective multicompartment capsule 200 can be inserted into a beverage forming apparatus that is operable to detach (i.e., melt) a portion of the thermally detachable partition 203, such as an outer perimeter of one or more thermally detachable partitions 203, such that the respective compartments are no longer fluidly isolated by the respective thermally detachable partitions 203 and the respective beverage formulations combine with fluid supplied by the beverage forming apparatus so as to form a beverage that may be dispensed from the beverage forming apparatus. In an embodiment, the thermally detachable partitions 203 can be formed of carnauba wax, or other thermally detachable food grade material. The formation and dispensing of beverages from a beverage forming apparatus that receives a multicompartment capsule 200 as shown in FIGS. 2A-2F is more fully described with respect to FIGS. 9A and 9B.

Figure 2A:
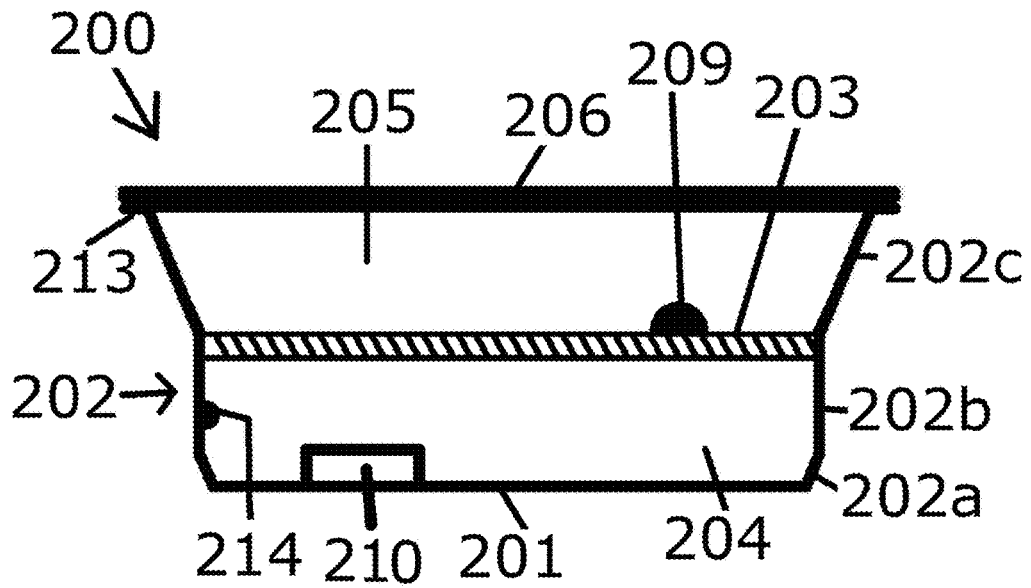
FIGS. 2A-2F are cross-sectional views of multicompartment capsules for use with a beverage forming apparatus according to embodiments disclosed herein.
Figure 2B:
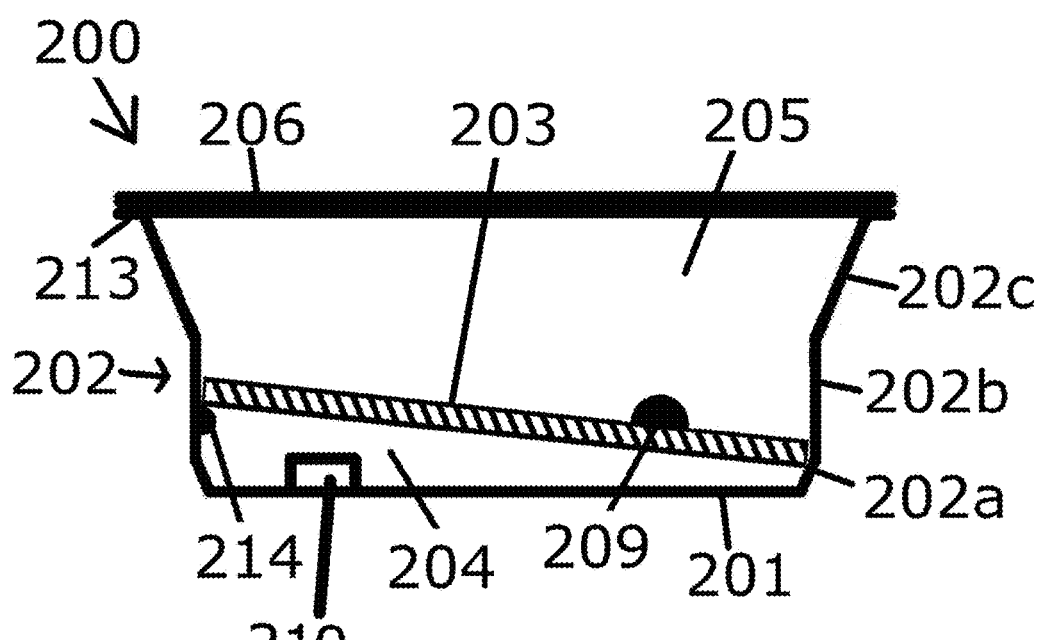

FIGS. 2A and 2B illustrate a cross-section of an embodiment of a multicompartment capsule 200 wherein FIG. 2A shows the multicompartment capsule 200 having a horizontal thermally detachable partition 203 in a sealed position which fluidly isolates, and preferably hermetically seals, a first beverage formulation contained in a first compartment 204 from a second beverage formulation contained in a second compartment 205. FIG. 2B shows the multicompartment capsule 200 in an unsealed position after the thermally detachable partition 203 has been detached by a beverage forming apparatus. Preferably, an inner surface of the sidewall 202 includes at least one catch 214, which catches an edge of the thermally detachable partition 203 when the thermally detachable partition 203 is detached by the beverage forming apparatus such that the first beverage formulation contained in the first compartment 204 is combined with the second beverage formulation contained in the second compartment 205 and fluid supplied by the beverage forming apparatus wherein a beverage may be subsequently dispensed by the beverage forming apparatus.

Preferably, the catch 214 obstructs an edge portion of the horizontal thermally detachable partition 203 from being downwardly displaced when the horizontal thermally detachable partition 203 is detached by a beverage forming apparatus and travels downwardly under the weight of gravity and/or the force of liquid being supplied by the beverage forming apparatus into the interior of the second compartment 205. The catch 214 which obstructs an edge portion of the horizontal thermally detachable partition 203 preferably causes the horizontal thermally detachable partition 203 to tilt when the thermally detachable partition 203 is detached such that the first and second compartments 204, 205 are no longer fluidly isolated. Preferably, the angle of the tilt of the detached horizontal thermally detachable partition 203 facilitates mixing between the first and second beverage formulations and fluid supplied by the beverage forming apparatus. The catch 214 further prevents the detached thermally detachable partition 203 from obstructing an opening in the base 201 or sidewall 202 of the multicompartment capsule 200 through which a beverage is dispensed, or an orifice of a dispensing piercing element of the beverage forming apparatus through which a beverage is dispensed. In a preferred embodiment, the thermally detachable partition 203 can include a counterweight 209, or uneven distribution of mass, arranged to increase the tilt angle of the thermally detachable partition 203 when detached. In a further embodiment, the base 201 can include a filter 210 that prevents the thermally detachable partition 203, or a detached portion thereof, from obstructing the opening through which a beverage is dispensed.

Figure 2C:
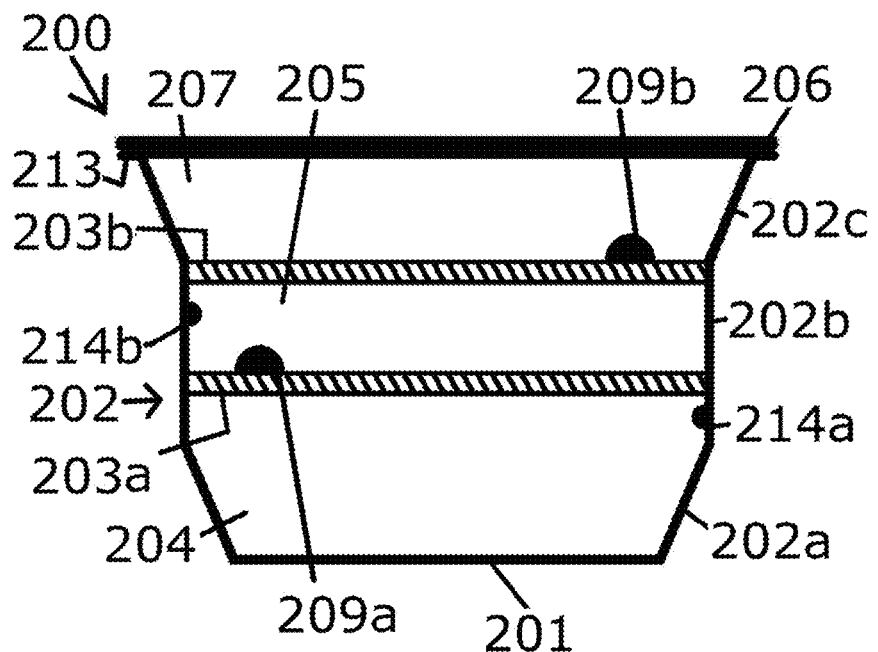
Figure 2D:
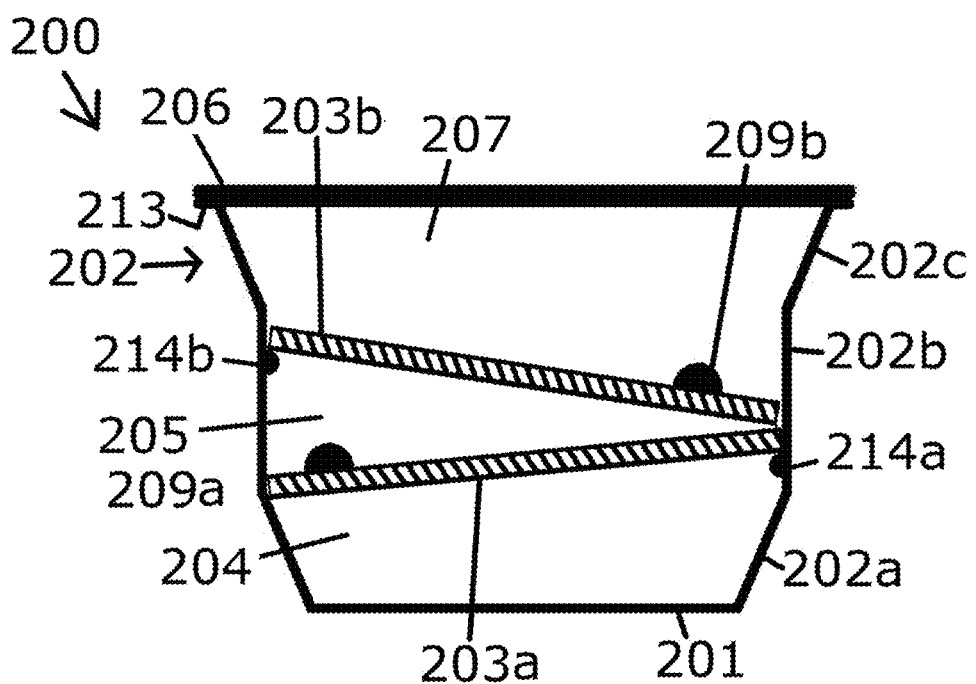

FIGS. 2C and 2D illustrate a cross section of a further embodiment of a multicompartment capsule 200 wherein the multicompartment capsule 200 includes a first compartment 204 having a first beverage formulation therein, a second compartment 205 having a second beverage formulation therein, and a third compartment 207 having a third beverage formulation therein. FIG. 2C shows the multicompartment capsule 200 having a first horizontal thermally detachable partition 203a in a sealed position which fluidly isolates, and preferably hermetically seals, the first beverage formulation contained in the first compartment 204 from the second beverage formulation contained in the second compartment 205, and a second horizontal thermally detachable partition 203b in a sealed position which fluidly isolates, and preferably hermetically seals, the second beverage formulation contained in the second compartment 205 from the third beverage formulation contained in the third compartment 207.

FIG. 2D shows the multicompartment capsule 200 in an unsealed position after the first and second thermally detachable horizontal partitions 203a, 203b have been detached by a beverage forming apparatus. Preferably, an inner surface of the sidewall 202 includes a first catch 214a, which catches an edge of the first horizontal thermally detachable partition 203a when the thermally detachable partition 203a is detached by the beverage forming apparatus such that the first beverage formulation contained in the first compartment 204 is combined with the second beverage formulation contained in the second compartment 205. The inner surface of the sidewall 202 includes a second catch 214b, which catches an edge of the second horizontal thermally detachable partition 203b when the thermally detachable partition 203b is detached by the beverage forming apparatus such that the third beverage formulation contained in the third compartment 207 is combined with the second beverage formulation contained in the second compartment 205, the first beverage formulation contained in the first compartment 204, and fluid supplied by the beverage forming apparatus such that a beverage may be subsequently dispensed by the beverage forming apparatus.

Preferably, the first and second catches 214a, 214b each obstruct a respective edge portion of the first and second horizontal thermally detachable partitions 203a, 203b from being downwardly displaced when the horizontal thermally detachable partitions 203a, 203b are detached by a beverage forming apparatus and travel downwardly under the weight of gravity and/or the force of liquid being supplied by the beverage forming apparatus into the interior of the third compartment 207. The catches 214a, 214b which obstruct respective edge portions of the horizontal partitions 203a, 203b cause the horizontal thermally detachable partitions 203a, 203b to each tilt when the respective thermally detachable partitions 203a, 203b are detached such that the first, second, and third compartments 204, 205, 207 are no longer fluidly isolated. Preferably, the angle of the tilt of the detached horizontal thermally detachable partitions 203a, 203b facilitates mixing among the first, second, and third beverage formulations and fluid supplied by the beverage forming apparatus. The catches 214a, 214b further prevent the detached thermally detachable partitions 203a, 203b from obstructing an opening in the base 201 or sidewall 202 of the multicompartment capsule 200 through which a beverage is dispensed, or an orifice of a dispensing piercing element of the beverage forming apparatus through which a beverage is dispensed. In a preferred embodiment, the thermally detachable partitions 203a, 203b can each include respective counterweights 209a, 209b, or uneven distributions of mass, arranged so as to increase the tilt angles of the respective thermally detachable partitions 203a, 203b when detached.

Figure 2E:
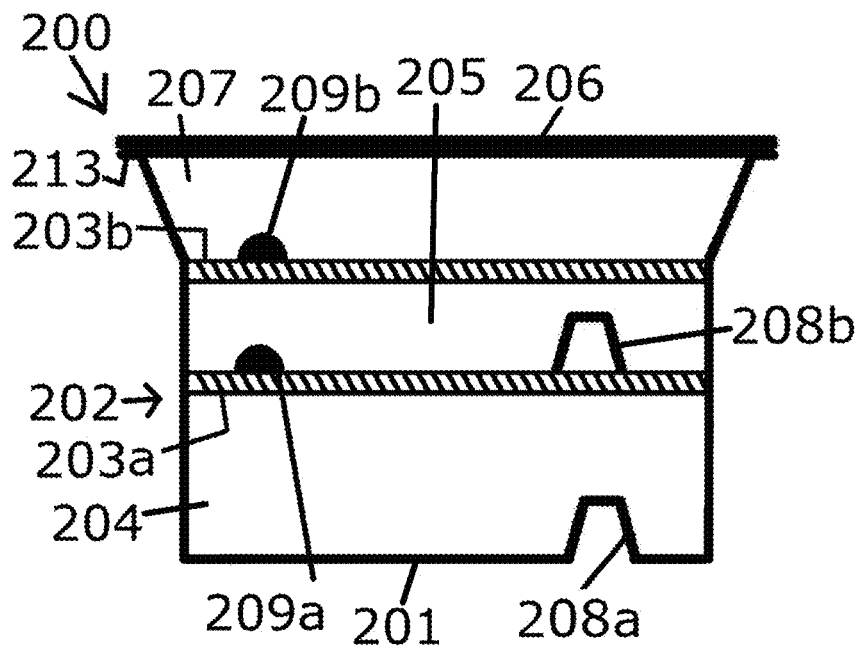
Figure 2F:
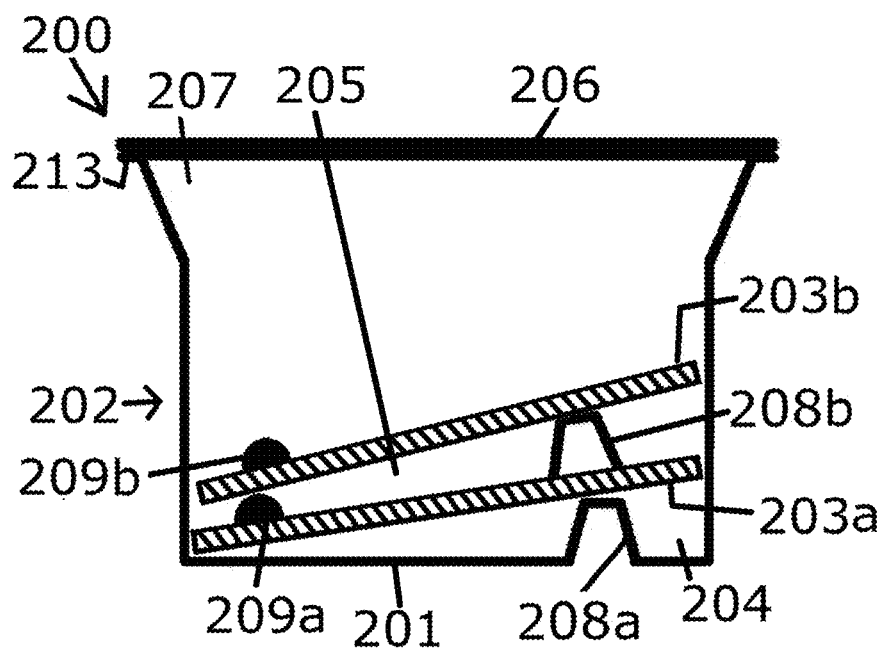

FIGS. 2E and 2F illustrate a cross section of a further embodiment of a multicompartment capsule 200 wherein the multicompartment capsule 200 includes a first compartment 204 having a first beverage formulation therein, a second compartment 205 having a second beverage formulation therein, and a third compartment 207 having a third beverage formulation therein. FIG. 2E shows the multicompartment capsule 200 having a first horizontal thermally detachable partition 203a in a sealed position which fluidly isolates, and preferably hermetically seals, the first beverage formulation contained in the first compartment 204 from the second beverage formulation contained in the second compartment 205, and a second horizontal thermally detachable partition 203b in a sealed position which fluidly isolates, and preferably hermetically seals, the second beverage formulation contained in the second compartment 205 from the third beverage formulation contained in the third compartment 207. If desired, more partitions can be included so as to form more isolated compartments. FIG. 2F shows the multicompartment capsule 200 in an unsealed position after the first and second horizontal thermally detachable partitions 203a, 203b have been detached by a beverage forming apparatus.

Preferably, the multicompartment capsule 200 includes at least one protrusion 208a that extends upwardly from the base 201 that forms a fulcrum which causes the detached thermally detachable partition 203a to pivot when a lower surface of the thermally detachable partition 203a contacts the at least one protrusion 208a so as to facilitate mixing between a first beverage formulation in the first compartment 204 with a second beverage formulation in the second compartment 205, and further with fluid supplied by the beverage forming apparatus. The first thermally detachable partition 203a of the multicompartment capsule 200 also includes at least one protrusion 208b that extends upwardly from an upper surface thereof and which forms a fulcrum which causes the second detached thermally detachable partition 203b to pivot when a lower surface of the second thermally detachable partition 203b contacts the at least one protrusion 208b so as to facilitate mixing among a third beverage formulation in the third compartment 207, the first beverage formulation in the first compartment 204, the second beverage formulation in the second compartment 205, and fluid supplied by the beverage forming apparatus.

Additionally, the at least one protrusion 208a of the base 201 and the at least one protrusion 208b of the first thermally detachable partition 203a are operable to keep the detached first and second thermally detachable partitions 203a, 203b from obstructing a dispensing opening formed in the multicompartment capsule 200 by a dispensing piercing element of the beverage forming apparatus or an orifice of the dispensing piercing element through which the combined beverage formulations and liquid are dispensed. In a preferred embodiment, the first and second thermally detachable partitions 203a, 203b can each include a respective counterweight 209a, 209b wherein the respective counterweights 209a, 209b are arranged to increase the pivoting action of the first thermally detachable partition 203a about the protrusion 208a, and the second thermally detachable partition 203b about the protrusion 208b. Alternatively, the thermally detachable partitions 203a, 203b can be formed so as to have an uneven distribution of mass arranged to increase the pivoting action thereof about a fulcrum.

Figures 3A, 3B:
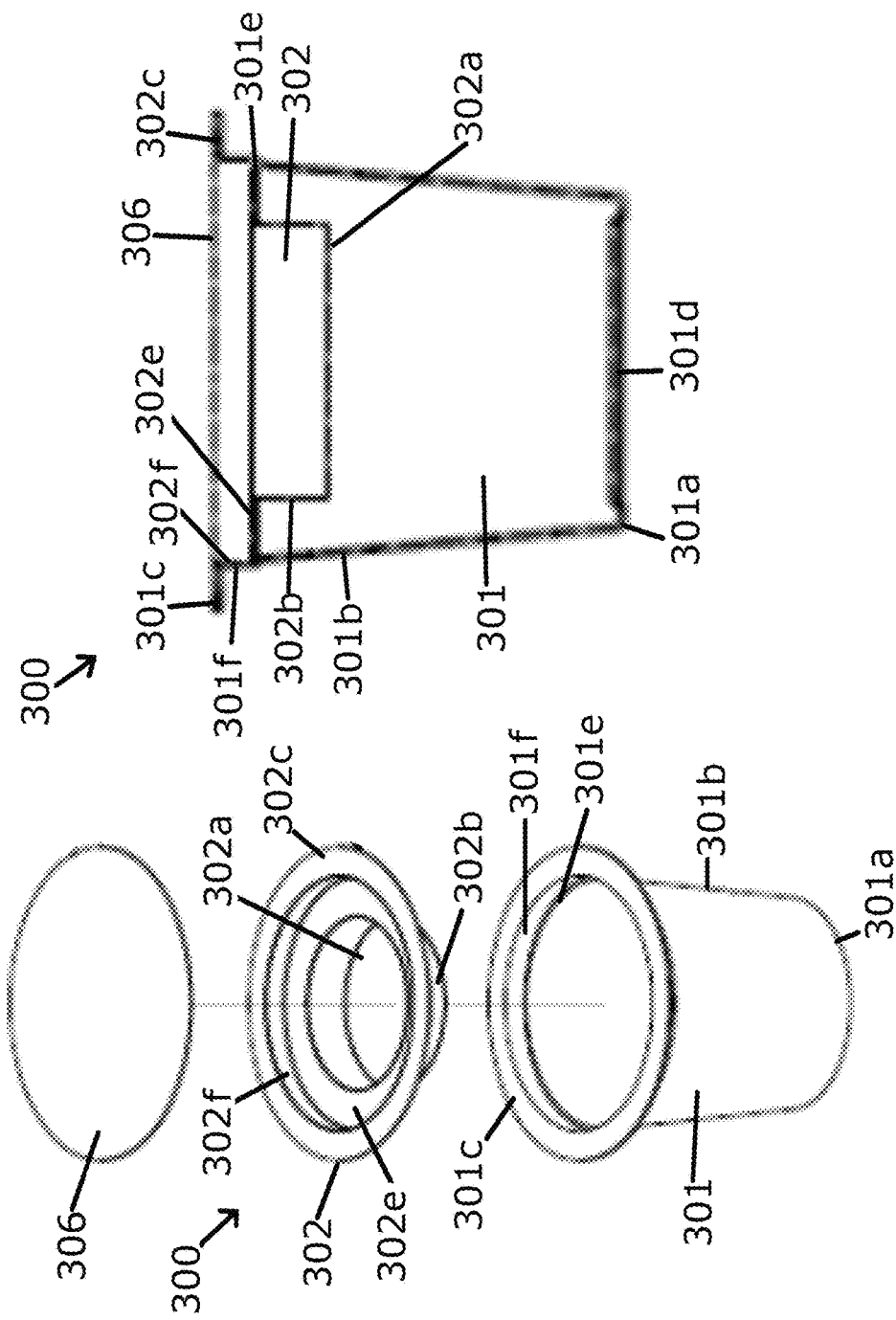

FIG. 3A shows an exploded view of a multicompartment capsule 300 according to an embodiment disclosed herein. FIG. 3B illustrates a cross section of the multicompartment capsule 300 shown in FIG. 3A. FIG. 3C shows a cross section of a first compartment 301 of the multicompartment capsule 300 shown in FIG. 3A. FIG. 3D shows an exploded view of detail d of FIG. 3C, and FIG. 3E shows an exploded view of detail e of FIG. 3C. FIG. 3F shows a cross section of a second compartment 302 of the multicompartment capsule 300 shown in FIG. 3A. The multicompartment capsule 300 includes a first compartment 301 that contains a first beverage formulation therein, and a second compartment 302 that contains a second beverage formulation therein. The first compartment includes a circular base 301a, and a contoured sidewall that extends upwardly from the base 301a. The base 301a can include an upwardly extending indentation 301d in a central portion thereof. Preferably, the contoured sidewall includes a frustoconical sidewall 301b that extends upwardly and outwardly from the base 301a, an outwardly extending portion 301e that extends outwardly from an upper end of the frustoconical sidewall 301b, an upwardly extending portion 301f that extends upwardly from an outer end of the outwardly extending portion 301e, and an outwardly extending rim 301c that extends outwardly from an upper end of the upwardly extending portion 301f wherein the outwardly extending rim 301c surrounds an opening of the first compartment 301.

As shown in FIGS. 3C-3E, the first compartment 301 has a height of about 45 mm. The circular base 301a of the first compartment 301 has an outer diameter of about 35 mm. The upwardly extending indentation 301d in a central portion of the circular base thereof extends upwardly about 0.5 mm and has a radius of curvature of about 0.5 mm between an outer diameter of about 33.5 mm at a lower end thereof and an outer diameter of about 33 mm at an upper end thereof. Preferably, the contoured sidewall includes a frustoconical sidewall 301b that extends upwardly and outwardly from the base 301a wherein an inner corner between the sidewall 301b and base 301a has a radius of curvature of about 0.5 mm, and an outer corner therebetween has a radius of curvature of about 0.6 mm, wherein the frustoconical sidewall 301b has an upwardly extending length of about 40 mm. An outer corner between the outwardly extending portion 301e and the frustoconical sidewall 301b has a radius of curvature of about 0.6 mm. The upwardly extending portion 301f and the outwardly extending portion 301e form an outer corner having a radius of curvature of about 1.2 mm, and an inner corner having a radius of curvature of about 0.5 mm, wherein the upwardly extending portion 301f has a height of about 2.8 mm and an outer diameter of about 45 mm. The outwardly extending rim 301c has a thickness of about 0.7 mm and extends outwardly about 5 mm from an opening of the first compartment 301 and about 4.2 mm from an upper outer end of the upwardly extending portion 301f so as to form an inner corner having a radius of curvature of about 0.38 mm and an outer corner having a radius of curvature of about 0.01 mm. The outwardly extending rim 301c has an outer diameter of about 55 mm, and surrounds an opening of the first compartment 301 that has a diameter of about 45 mm. A lower surface of the rim 301c is about 44 mm above a lower surface of the base 301a.

The second compartment 302 preferably includes a circular base 302a having a diameter of about 30 mm, and a sidewall that extends upwardly from the base 302a. The sidewall preferably includes a tubular sidewall 302b that extends upwardly about 8 mm from the base. An outwardly extending portion 302e that extends outwardly from an upper end of the tubular sidewall 302b has a diameter of about 44 mm, and forms an inner corner therebetween having a radius of curvature of about 0.1 mm. An upwardly extending portion 302f extends upwardly from an outer end of the outwardly extending portion 302e, and an outwardly extending rim 302c, having a thickness of about 0.1 mm, extends outwardly from an upper end of the upwardly extending portion 302f. The outwardly extending rim 302c surrounds an opening of the second compartment 302 and has an outer diameter of about 54 mm.

The second compartment 302 fits in the opening of the first compartment 301 such that an upper surface of the outwardly extending rim 301c of the first compartment 301 mates against a lower surface of the outwardly extending rim 302c of the second compartment. In this manner, a first beverage formulation can be supplied to an interior of the first compartment 301, and subsequently sealed therein when the upper surface of the outwardly extending rim 301c of the first compartment 301 mates against, and is sealed to, the lower surface of the outwardly extending rim 302c of the second compartment 302. Preferably, an outer corner formed by the outwardly extending portion 302e and the upwardly extending portion 302f of the second compartment 302 is mated with an inner corner formed by the outwardly extending portion 301e and upwardly extending portion 301f of the first compartment. In this embodiment, the mated corners can be sealed together in addition to, or instead of the mated outwardly extending rims 301c, 302c of the respective first and second compartments 301, 301. Further, the upwardly extending portions 301f, 302f of the respective first and second compartments 301, 302 can be sealed together in addition to, or instead of, the mated corners and/or the mated outwardly extending rims 301c, 302c.

The multicompartment capsule 300 includes a lid 306 which is sealed to an upper surface of the outwardly extending rim 302c of the second compartment. Thus, a second beverage formulation can be supplied to an interior of the second compartment 302, and subsequently sealed therein when the upper surface of the outwardly extending rim 302c of the second compartment 302 is sealed to a lower surface of the lid 306.

The multicompartment capsule 300 can be inserted into a beverage forming apparatus wherein the beverage forming apparatus includes a liquid supplying piercing element that can be inserted through the lid 306 and the base 302a of the second compartment 302 so as to pass through the second compartment 302, enter the interior of first compartment 301 and supply liquid thereto. In an embodiment, the piercing element can pierce the base 302a such that the second beverage formulation included in the second compartment 302 enters the first compartment 301 and combines with the first beverage formulation in the first compartment 301 and the liquid supplied by the liquid supplying piercing element of the beverage forming apparatus.

Alternatively, the beverage forming apparatus can be operable to pierce the base 302a of the second compartment 302 so as to enter the first compartment 301, and then retract therefrom so as to form an opening in the base 302a of the second compartment 302. The liquid supplying piercing element can supply liquid to the interior of the second compartment 302 such that the supplied liquid combines with the second beverage formulation in the second compartment 302. The supplied liquid which has combined with the second beverage formulation is then combined with a first beverage formulation in the first compartment 301 through the opening formed in the base 302a of the second compartment. In a further embodiment, the beverage forming apparatus can be operable to pierce the lid 306 of the multicompartment capsule 300 and supply liquid to an interior of the second compartment 302 at a pressure sufficient to cause the second compartment 302 to rupture such that the first beverage formulation in the first compartment 301 can combine with the second beverage formulation in the second compartment 302 and the fluid supplied by the beverage forming apparatus through an orifice of the liquid supplying piercing element. In an embodiment, the second compartment 302 can include a weakened portion which is operable to rupture after a predetermine pressure has been attained in the second compartment 302 of the multicompartment capsule 300. The weakened portion can be formed in the base 302a of the second compartment 302, the tubular sidewall 302b of the second compartment 302, a portion of the corner between the tubular sidewall 302b and the base 302a, or the corner formed between the tubular sidewall 302b and the outwardly extending portion 302e.

Likewise, the beverage forming apparatus can include at least one dispensing piercing element that can be inserted through the base 301a, the upwardly extending indentation 301d of the base 301a, a lower portion of the frustoconical sidewall 301b of the multicompartment capsule 300 such that the liquid supplied by the beverage forming apparatus that has combined with the respective beverage formulations in the first and second compartments 301, 302 may be dispensed by the beverage forming apparatus into a suitable vessel such as a drinking vessel. The combined liquid and beverage formulations can be dispensed through a respective orifice of the dispensing piercing element, or alternatively through a respective opening in the multicompartment capsule 300 formed by the dispensing piercing element. In an embodiment, the beverage forming apparatus can include a mixing unit, wherein the respective beverage formulations, which have been combined with the supplied fluid, can be combined in the mixing unit and subsequently dispensed from the beverage forming apparatus. Alternatively, the respective beverage formulations, which have been combined with the supplied fluid, can be individually dispensed into and combined in a drinking vessel.

Figure 4A:
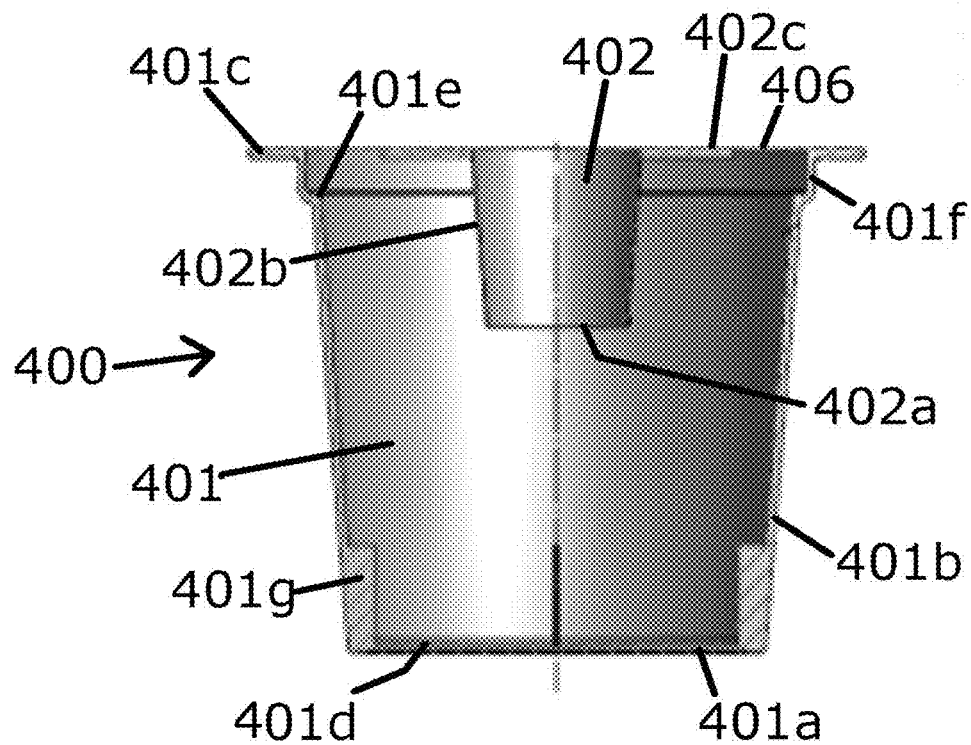
FIGS. 4A and 4B show cross-sectional views of a multicompartment capsule for use with a beverage forming apparatus according to an embodiment disclosed herein.
Figure 4B:
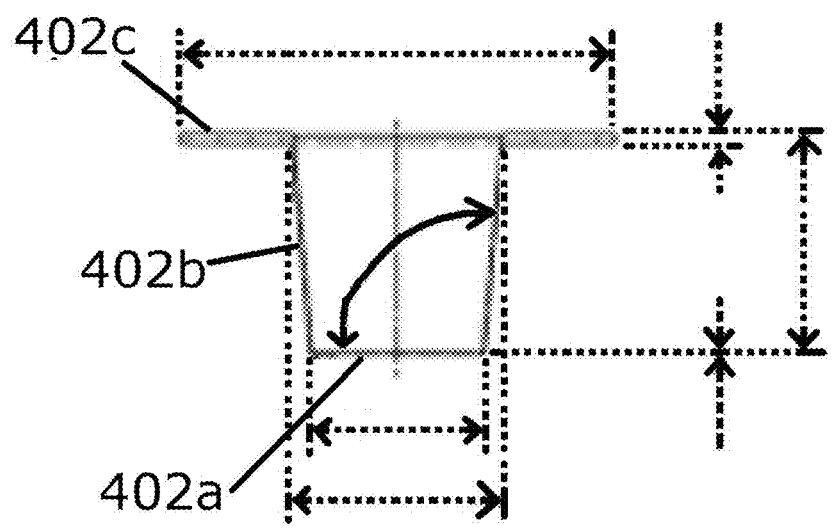

FIG. 4A shows a cross section of a multicompartment capsule 400 according to an embodiment disclosed herein. FIG. 4B shows details of a second compartment 402 of the multicompartment capsule 400 according to an embodiment as disclosed herein. The multicompartment capsule 400 includes a first compartment 401 that contains a first beverage formulation therein, and a second compartment 402 that contains a second beverage formulation therein. The first compartment 401 includes a circular base 401a, and a contoured sidewall that extends upwardly from the base 401a. The base 401a can include an upwardly extending indentation 401d in a central portion thereof. Preferably, the contoured sidewall includes a frustoconical sidewall 401b that extends upwardly and outwardly from the base 401a, an outwardly extending portion 401e that extends outwardly from an upper end of the frustoconical sidewall 401b, an upwardly extending portion 401f that extends upwardly from an outer end of the outwardly extending portion 401e, and an outwardly extending rim 401c that extends outwardly from an upper end of the upwardly extending portion 401f wherein the outwardly extending rim 401c surrounds an opening of the first compartment 401. In an embodiment, a lower inner portion of the frustoconical sidewall 401b can include one or more ribs 401g which are preferably operable to facilitate mixing of beverage formulations and fluid supplied by the beverage forming apparatus, and also increase the structural integrity of the multicompartment capsule 400. In an embodiment, the first compartment 401 can include the same or similar dimensions as the first compartment 301 described in FIGS. 3A-3E.

The second compartment 402 preferably includes a circular base 402a having a diameter of about 12.5 mm, and a frustoconical sidewall 402b that extends upwardly about 15 mm and outwardly at an angle of about 95° from the base 402a such that the frustoconical sidewall 402b has a diameter of about 15 mm at an upper end thereof. An outwardly extending rim 402c having a thickness of about 0.7 mm and a diameter of about 31 mm extends outwardly from an upper end of the frustoconical sidewall 402b. A second beverage formulation can be supplied to an interior of the second compartment 402, and an upper surface of the outwardly extending rim 402c can be sealed against an inner periphery of a lower surface of a lid 406 of the multicompartment capsule 400 to seal the beverage formulation therein. Preferably the outwardly extending rim 402c of the second compartment 402 is sealed to the lower surface of the lid 406 such that a central axis of the second compartment 402 is aligned with a central axis of the lid 406. However, in an alternate embodiment, the central axis of the second compartment 402 can be offset from the central axis of the lid 406. In a further embodiment, a third compartment of similar construction to the second compartment 402 can include a third beverage formulation and be sealed to a lower surface of the lid adjacent the second compartment 402. In this embodiment, preferably the central axis of the second compartment 402 and the central axis of the third compartment are each offset from the central axis of the lid 406.

After the second compartment 402 is sealed to the lid 406, a first beverage formulation can be supplied to an interior of the first compartment 401. An outer periphery of the lower surface of the lid 406 can then be sealed to an upper surface of the outwardly extending rim 401c of the first compartment 401 such that the second compartment 401 is suspended by the lid 406 in the interior of the first compartment 401.

The multicompartment capsule 400 can be inserted into a beverage forming apparatus wherein the beverage forming apparatus includes a liquid supplying piercing element that can be inserted through the lid 406 and the base 402a of the second compartment 402 so as to pass through the second compartment 402, enter the interior of first compartment 401 and supply liquid thereto. In an embodiment, the liquid supplying piercing element can pierce the base 402a of the second compartment 402 such that the second beverage formulation included in the second compartment 402 enters the first compartment 401 and combines with the first beverage formulation in the first compartment 401 and the liquid supplied by the liquid supplying piercing element of the beverage forming apparatus.

Alternatively, the beverage forming apparatus can be operable to pierce the base 402a of the second compartment 402 so as to enter the first compartment 401, and then retract therefrom so as to form an opening in the base 402a of the second compartment 402. The liquid supplying piercing element can supply liquid to the interior of the second compartment 402 such that the supplied liquid combines with the second beverage formulation in the interior of the second compartment 402. The supplied liquid which has combined with the second beverage formulation is then combined with the first beverage formulation in the first compartment 401 through the opening formed in the base 402a of the second compartment. The pressure buildup caused by supplying the liquid to the interior of the second compartment 402 can increase the velocity through which the liquid and second beverage formulation are supplied through the opening in the base 402a so as to facilitate mixing of the fluid, second beverage formulation, and the first beverage formulation in the interior of the first compartment 401.

In a further embodiment, the beverage forming apparatus can be operable to pierce the lid 406 of the multicompartment capsule 400 and supply liquid to an interior of the second compartment 402 at a pressure sufficient to cause the second compartment 402 to rupture such that the first beverage formulation in the first compartment 401 is combined with the second beverage formulation in the second compartment 402 and the fluid supplied by the beverage forming apparatus. In an embodiment, the second compartment 402 can include a weakened portion which is operable to rupture after a predetermine pressure buildup has been attained in the second compartment 402 of the multicompartment capsule 400. The weakened portion can be formed in the base 402a of the second compartment 402. In an embodiment, the base 402a can be formed of a membrane material that is weaker than the material of the frustoconical sidewall 402b and the outwardly extending rim 402c, and therefore prone to rupture. Alternatively the weakened portion can be in the frustoconical sidewall 402b of the second compartment 402, or one or more portions of the corner formed between the frustoconical sidewall 402a and the base 402a.

The beverage forming apparatus can include at least one dispensing piercing element that can be inserted through the base 401a, the upwardly extending indentation 401d of the base 401a, or lower portion of the frustoconical sidewall 401b of the multicompartment capsule 400 such that the liquid supplied by the beverage forming apparatus that has combined with the respective beverage formulations in the first and second compartments 401, 402 may be dispensed by the beverage forming apparatus into a suitable vessel such as a drinking vessel. The combined liquid and beverage formulations can be dispensed through a respective orifice of the dispensing piercing element, or alternatively through a respective opening in the multicompartment capsule 400 formed by the dispensing piercing element. In an embodiment, the beverage forming apparatus can include a mixing unit, wherein the respective beverage formulations, which have been combined with the fluid, can be supplied and combined, and subsequently dispensed from the beverage forming apparatus. Alternatively, the respective beverage formulations, which have been combined with the supplied fluid, can be dispensed into and combined in a drinking vessel without passing through a mixing unit.

FIGS. 5A-5D illustrate an embodiment of making a multicompartment capsule 500 according to embodiments disclosed herein. The formed multicompartment capsule 500 includes a first compartment 501 and a second compartment 502 that are formed from a continuous wall 504 of thermoformed material. To make the multicompartment capsule 500, a sheet of thermoformable material 520 is supplied to a thermoforming apparatus. In an embodiment, the sheet of thermoformable material 520 can be cut or shaped into a predetermined pattern, having a first end 510a and a second end 510b, and foldable portions 509a, 509b (See FIG. 5A) before being supplied to the thermoforming apparatus. Alternatively, the sheet of thermoformable material 520 can first be thermoformed, and then cut to desired specifications, or the foldable portions 509a, 509b can be formed by the thermoforming apparatus.

The sheet of thermoformable material 520 is supplied to a thermoforming apparatus which thermoforms the sheet such that the sheet includes a first compartment 501 and a second compartment 502. In a preferred embodiment, the thermoforming apparatus is operable to emboss a weak spot or hinge at the foldable portions 509a, 509b such that the thermoformed material may more readily fold at the foldable portions 509a, 509b. As shown in FIG. 5B, the first compartment 501 includes a base 501a and a sidewall 501b that extends upwardly from the base 501a. The sidewall 501b may be a contoured sidewall according to the embodiments disclosed herein, and the base 501a can be a contoured base according to embodiments disclosed herein. An outwardly extending rim 501c extends outwardly from an upper end of the sidewall 501b. The second compartment 502 includes a base 502a, a sidewall 502b that extends downwardly from the base 502a, and an outwardly extending rim 502c that extends outwardly from a lower end of the sidewall 502b. The sidewall 502b may be a contoured sidewall according to the embodiments disclosed herein, and the base 502a can be a contoured base according to embodiments disclosed herein. The outwardly extending rim 501c of the first compartment 501 is connected to the outwardly extending rim 502c of the second compartment 502 at the foldable portion 509a.

After the first and second compartments 501, 502 are formed, the interior of the first compartment 501 is filled with a predetermined amount of a first beverage formulation. The sheet of thermoformed material 520 is then folded along the foldable portion 509a such that the base 502a and a portion of the sidewall 502b of the second compartment 502 are located in the interior of the first compartment 501, and a lower surface of the outwardly extending rim 502c mates with an upper surface of the outwardly extending rim 501c of the first compartment. In an embodiment, the mated outwardly extending rims 501c and 502c are sealed together so as to seal the interior of the first compartment 501 and form a multicompartment capsule 500 from a continuous wall 504. After the outwardly extending rims 501c and 502c are sealed together, a predetermined amount of a second beverage formulation can be supplied to the interior of the second compartment 502 wherein a lower surface of a lid 506, such as a foil lid, or multi-layer lid including one or more layers of metal film (e.g. foil) and plastic, can be sealed to an upper surface of the outwardly extending rim 502c of the second compartment 502.

In an embodiment, as shown in FIG. 5C, the sheet of thermoformed material 520 can include a lid 506 formed from the continuous wall of thermoformable material wherein the lid 506 is connected to the outwardly extending rim 502c of the second compartment at the foldable portion 509b. The sheet of thermoformed material 520 is then folded at the foldable portion 509b such that the lid 506 covers the opening of the second compartment 502. A lower surface of the lid 506 is then sealed to an upper surface of the outwardly extending rim 502c of the second compartment 502 so as to form a multicompartment capsule 500 including the first beverage formulation in the first compartment 501 and the second beverage formulation in the second compartment 502 from the continuous wall 504. In an alternate embodiment, the mated outwardly extending rims 501c and 502c are not sealed together until after the interior of the second compartment 502 has been supplied the predetermined amount of the second beverage formulation. In this embodiment, the mated outwardly extending rims 501c and 502c are sealed in a single step with the lid 506 which has been folded over the opening of the second compartment 502 so as to form a multicompartment capsule 500 from the continuous wall 504. Preferably the volume of the interior of the first compartment 501 is large enough such that the second compartment 502 can be located in the interior of the first compartment 501 without displacing, and preferably without contacting, the first beverage formulation. Preferably, the volumes and dimensions of the respective compartments are selected such that thermal degradation of beverage formulations contained therein does not occur during heat sealing, welding, or other operations such as folding which may require, or be enhanced by heating of the material of the multicompartment capsules.

In an embodiment, the thermoforming apparatus is operable to emboss the base 502a of the second compartment 502 so as to form an integral weak-spot, or partially-perforated area 540 therein that will rupture under a predetermined pressure. Alternatively, the thermoforming apparatus is operable to form an integral weak-spot, or partially-perforated area 540 in the sidewall 502b, or a portion of a corner between the sidewall 502b and the base 502a, such that the weak-spot or partially-perforated area may rupture under a predetermined-pressure. In this manner, the multicompartment capsule 500 can be inserted into a beverage forming apparatus that is operable to puncture the lid 506 with a liquid supplying piercing element and supply liquid to the interior of the second compartment 502 in a manner that causes the pressure in the interior of the second compartment 502 to exceed the predetermined rupture pressure of the weak-spot, or partially-perforated area 540 in the base 502a, the sidewall 502b, or the portion of the corner between the base 502a and sidewall 502b such that the weak-spot, or partially-perforated area 540 ruptures and the supplied liquid and second beverage formulation combine with the first beverage formulation in the first compartment 501. Alternatively, the second compartment 502 may not include a weakened area wherein a liquid supplying piercing element of the beverage forming apparatus may be operable to pierce the base 502a of the second compartments 502 such that liquid supplied by the liquid supplying piercing element may be combined with the respective first and second beverage formulations.

A dispensing piercing element of the beverage forming apparatus can pierce the base 501a or a lower portion of the sidewall 501b of the first compartment 501 such that a beverage may be dispensed therefrom. Alternatively, the base 501a, the sidewall 501b, or a portion of a corner between the base 501a and sidewall 501b of the first compartment 501 can include a weak-spot or partially-perforated area such that the first compartment 501 ruptures under a predetermined pressure that may be achieved therein such that a beverage may be dispensed therefrom. In a further embodiment described herein, a beverage forming apparatus may not include a dispensing piercing element wherein a liquid supplying piercing element may be configured to pierce the base of the first compartment of the multicompartment capsule so as to form a dispensing outlet and then retract to then supply fluid to the interior of the multicompartment capsule. For example, with respect to FIG. 5D, bases 502a, 501a may be pierced by a liquid supplying piercing element so as to form outlets therein, and then retract and supply liquid to an interior of the first or second compartment 501, 502 that may then be dispensed from the formed outlet.

FIGS. 6A-6E illustrate an embodiment of making a multicompartment capsule 600 according to embodiments disclosed herein. The formed multicompartment capsule 600 includes a first compartment 601, a second compartment 602, and a third compartment 603 that are formed from a continuous wall 604 of thermoformed material. To make the multicompartment capsule 600, a sheet of thermoformable material 620 is supplied to a thermoforming apparatus. In an embodiment, the sheet of thermoformable material 620 can be cut or shaped into a predetermined pattern, having a first end 610a and a second end 610b, and foldable portions 609a, 609b, 609c (See FIG. 6A) before being supplied to the thermoforming apparatus. Alternatively, the sheet of thermoformable material 620 can first be thermoformed, and then cut to desired specifications, or the foldable portions 609a, 609b, 609c can be formed by the thermoforming apparatus.

The sheet of thermoformable material 620 is supplied to a thermoforming apparatus which thermoforms the sheet such that the sheet includes a first compartment 601, a second compartment 602, and a third compartment 603. In a preferred embodiment, the thermoforming apparatus is operable to emboss a weak spot or hinge at the foldable portions 609a, 609b such that the thermoformed material may more readily fold at the foldable portions 609a, 609b. As shown in FIG. 6B, the first compartment 601 includes a base 601a and a sidewall 601b that extends upwardly from the base 601a. The sidewall 601b may be a contoured sidewall according to the embodiments disclosed herein, and the base 601a can be a contoured base according to embodiments disclosed herein. An outwardly extending rim 601c extends outwardly from an upper end of the sidewall 601b. The second compartment 602 includes a base 602a, a sidewall 602b that extends downwardly from the base 602a, and an outwardly extending rim 602c that extends outwardly from a lower end of the sidewall 602b. The sidewall 602b may be a contoured sidewall according to the embodiments disclosed herein, and the base 602a can be a contoured base according to embodiments disclosed herein. The outwardly extending rim 601c of the first compartment 601 is connected to the outwardly extending rim 602c of the second compartment 602 at the foldable portion 609a. The third compartment 603 includes a base 603a and a sidewall 603b that extends upwardly from the base 603a. The sidewall 603b may be a contoured sidewall according to the embodiments disclosed herein, and the base 603a can be a contoured base according to embodiments disclosed herein. An outwardly extending rim 603c extends outwardly from an upper end of the sidewall 603b wherein the outwardly extending rim 603c is attached to the outwardly extending rim 602c of the second compartment at the foldable portion 609b.

After the first, second, and third compartments 601, 602, 603 are formed, the interior of the first compartment 601 is filled with a predetermined amount of a first beverage formulation. The sheet of thermoformed material 620 is then folded along the foldable portion 609a such that the base 602a and a portion of the sidewall 602b of the second compartment 602 are located in the interior of the first compartment 601, and a lower surface of the outwardly extending rim 602c mates with an upper surface of the outwardly extending rim 601c of the first compartment 601 (See FIG. 6C). In an embodiment, the mated outwardly extending rims 601c and 602c are sealed together so as to seal the interior of the first compartment 601. After the outwardly extending rims 601c and 602c are sealed together, a predetermined amount of a second beverage formulation is supplied to the interior of the second compartment 602.

The sheet of thermoformed material 620 is then folded along the foldable portion 609b such that the base 603a and a portion of the sidewall 603b of the third compartment 603 are located in the interior of the second compartment 602, and a lower surface of the outwardly extending rim 603c mates with an upper surface of the outwardly extending rim 602c of the second compartment 602. In an embodiment, the mated outwardly extending rims 602c and 603c are sealed together so as to seal the second beverage formulation in the interior of the second compartment 602 and form a multi-compartment capsule 600 from a continuous wall 604 (i.e., single sheet of polymer material including one or more layers). After the outwardly extending rims 602c and 603c are sealed together, a predetermined amount of a third beverage formulation is supplied to the interior of the third compartment 603. A lower surface of a lid 606, such as a foil lid, or multi-layer lid including one or more layers of metal film (e.g. foil) and plastic, can be sealed to an upper surface of the outwardly extending rim 603c of the third compartment 603 to thereby seal the third beverage formulation in the third compartment.

In an embodiment, as shown in FIG. 6D, the sheet of thermoformed material 620 can include the lid 606 formed therein wherein the sheet of thermoformed material 620 is folded at the foldable portion 609c such that the lid 606 covers the opening of the third compartment 603. A lower surface of the lid 606 is then sealed to an upper surface of the outwardly extending rim 603c of the third compartment 603 so as to form a multicompartment capsule 600 including the first beverage formulation sealed in the first compartment 601, the second beverage formulation sealed in the second compartment 602, and the third beverage formulation sealed in the third compartment from the continuous wall 604. In an alternate embodiment, the mated outwardly extending rims 601c, 602c, 603c are not sealed together until after the interior of the third compartment 603 has been supplied the predetermined amount of the third beverage formulation. In this embodiment, the mated outwardly extending rims 601c, 602c, 603d are sealed in a single step with the lid 606 which has been folded over the opening of the third compartment 603 so as to form a multicompartment capsule 600 from the continuous wall 604.

Preferably the volume of the interior of the first compartment 601 is large enough such that the second compartment 602 can be located in the interior of the first compartment 601 without displacing, and preferably without contacting, the first beverage formulation. Preferably the volume of the interior of the second compartment 602 is large enough such that the third compartment 603 can be located in the interior of the second compartment 602 without displacing, and preferably without contacting, the second beverage formulation. Preferably, the volumes and dimensions of the respective compartments are selected such that thermal degradation of beverage formulations contained therein does not occur during heat sealing, welding, or other operations such as folding which may require, or be enhanced by heating of the material of the multicompartment capsules.

In an embodiment, the thermoforming apparatus is operable to emboss the base 603a, 602a, and/or 601a of the respective third, second, and first compartments 603, 602, 601 such that an integral weak-spot, or partially-perforated area (see FIG. 5) can be formed therein that will rupture under a predetermined pressure. Alternatively, the thermoforming apparatus is operable to form an integral weak-spot, or partially-perforated area in a respective sidewall, or a portion of a corner between the a respective sidewall and base of the first, second, and/or third compartments 601, 602, 603, such that the weak-spot or partially-perforated area may rupture under a predetermined-pressure that is effected by a beverage forming apparatus during formation of a beverage. Alternatively, a liquid supplying piercing element of the beverage forming apparatus may be operable to pierce the respective bases 602a, 603a of the second and third compartments 602, 603 such that liquid supplied by the liquid supplying piercing element may be combined with the respective first, second, and third beverage formulations.

A dispensing piercing element of the beverage forming apparatus can pierce the base 601a or a lower portion of the sidewall 601b of the first compartment 601 such that a beverage may be dispensed therefrom. Alternatively, the base 601a, the sidewall 601b, or a portion of a corner between the base 601a and sidewall 601b of the first compartment 601 can include a weak-spot or partially-perforated area such that the first compartment 601 ruptures under a predetermined pressure that may be achieved therein such that a beverage may be dispensed therefrom.

FIGS. 7A-7D illustrate an embodiment of making a multicompartment capsule 700 according to embodiments disclosed herein. The formed multicompartment capsule 700 includes a first compartment 701, a second compartment 702, and a third compartment 703 that are formed from a continuous wall 704 (i.e., single sheet of polymer material) of thermoformed material 720. To make the multicompartment capsule 700, a sheet of thermoformable material 720 is supplied to a thermoforming apparatus. In an embodiment, the sheet of thermoformable material 720 can be cut or shaped into a predetermined pattern, having a first end 710a and a second end 710b, and foldable portions 709a, 709b (See FIG. 7A) before being supplied to the thermoforming apparatus. Alternatively, the sheet of thermoformable material 720 can first be thermoformed, and then cut to desired specifications, or the foldable portions 709a, 709b can be formed by the thermoforming apparatus.

The sheet of thermoformable material 720 is supplied to a thermoforming apparatus which thermoforms the sheet such that the sheet includes a first compartment 701, a second compartment 702, and a third compartment 703. In a preferred embodiment, the thermoforming apparatus is operable to emboss a weak spot or hinge at the foldable portions 709a, 709b such that the thermoformed material may more readily fold at the foldable portions 709a, 709b. As shown in FIG. 7B, the first compartment 701 includes a base 701a and a sidewall 701b that extends upwardly from the base 701a. The sidewall 701b may be a contoured sidewall according to the embodiments disclosed herein, and the base 701a can be a contoured base according to embodiments disclosed herein. An outwardly extending rim 701c extends outwardly from an upper end of the sidewall 701b. The second compartment 702 includes a base 702a, a sidewall 702b that extends downwardly from the base 702a, and an outwardly extending rim 702c that extends outwardly from a lower end of the sidewall 702b. The sidewall 702b may be a contoured sidewall according to the embodiments disclosed herein, and the base 702a can be a contoured base according to embodiments disclosed herein. The outwardly extending rim 701c of the first compartment 701 is connected to the outwardly extending rim 702c of the second compartment 702 at the foldable portion 709a. The third compartment 703 includes a base 703a and a sidewall 703b that extends downwardly from the base 703a. The sidewall 703b may be a contoured sidewall according to the embodiments disclosed herein, and the base 703a can be a contoured base according to embodiments disclosed herein. The third compartment 703 is located adjacent the second compartment 702 such that there is not a foldable portion between the second and third compartments 702, 703, and such that the third compartment 703 shares the outwardly extending rim 702c with the second compartment 702.

After the first, second, and third compartments 701, 702, 703 are formed, the interior of the first compartment 701 is filled with a predetermined amount of a first beverage formulation. The sheet of thermoformed material 720 is then folded along the foldable portion 709a such that the base 702a and a portion of the sidewall 702b of the second compartment 702, and the base 703a and a portion of the sidewall 703b of the third compartment 703 are located in the interior of the first compartment 701, and a lower surface of the outwardly extending rim 702c mates with an upper surface of the outwardly extending rim 701c of the first compartment 701. In this embodiment, the second compartment 702 is adjacent the third compartment 703 in the interior of the first compartment 701 (see FIG. 7C).

In an embodiment, the mated outwardly extending rims 701c and 702c are sealed together so as to seal the interior of the first compartment 701 and form a multicompartment capsule 700 from the continuous wall 704. After the outwardly extending rims 701c and 702c are sealed together, a predetermined amount of a second beverage formulation is be supplied to the interior of the second compartment 702 and a predetermined amount of a third beverage formulation is supplied to the interior of the third compartment 703. A lower surface of a lid 706, such as a foil lid, or multi-layer lid including one or more layers of metal film (e.g. foil) and plastic, can be sealed to an upper surface of the outwardly extending rim 702c of the second compartment 702 so as to seal the respective openings of both the second compartment 702 and the third compartment 703.

In an alternate embodiment, as shown in FIG. 7C, the sheet of thermoformed material 720 can include a lid 706 of thermoformable material wherein the lid 706 is connected to the outwardly extending rim 702c of the second compartment at the foldable portion 709b. The sheet of thermoformed material 720 is then folded at the foldable portion 709b such that the lid 706 covers the respective openings of the second and third compartments 702, 703. A lower surface of the lid 706 is then sealed to an upper surface of the outwardly extending rim 702c of the second compartment 702 so as to form a multicompartment capsule 700 including the first beverage formulation sealed in the first compartment 701, the second beverage formulation sealed in the second compartment 702, and the third beverage formulation sealed in the third compartment 703 from the continuous wall 704.

In an alternate embodiment, the mated outwardly extending rims 701c and 702c are not sealed together until after the interiors of the second and third compartments 702, 703 have been supplied the respective predetermined amounts of the second and third beverage formulations. In this embodiment, the mated outwardly extending rims 701c and 702c are sealed in a single step with the lid 706 which has been folded over the openings of the second and third compartments 702, 703 so as to form a multicompartment capsule 700 from the continuous wall 704. Preferably the volume of the interior of the first compartment 701 is large enough such that the second and third compartments 702, 703 can be located in the interior of the first compartment 701 without displacing, and preferably without contacting, the first beverage formulation. Preferably the volumes and dimensions of the respective compartments are selected such that thermal degradation of beverage formulations contained therein does not occur during heat sealing, welding, or other operations such as folding which may require, or be enhanced by heating of the material of the multicompartment capsules.

In an embodiment, the thermoforming apparatus is operable to emboss the respective bases 702a, 703a of the second and third compartments 702, 703 so as to form respective integral weak-spots, or partially-perforated areas (see FIG. 5) therein that will rupture under a predetermined pressure. Alternatively, the thermoforming apparatus is operable to form an integral weak-spot, or partially-perforated area in the base 701a of the first compartment, the sidewalls, or a portion of a corner between a respective sidewall and base of the first, second, and/or third compartments 701, 702, 703, such that the weak-spot or partially-perforated area may rupture under a predetermined-pressure. In this manner, the multicompartment capsule 700 can be inserted into a beverage forming apparatus that is operable to puncture the lid 706 with a liquid supplying piercing element and supply liquid to the interior of multicompartment capsule 700 in a manner that causes the pressure in the interior of one or more of the respective compartments 701, 702, 703 to exceed the predetermined rupture pressure of the weak-spot, or partially-perforated area such that the respective weak-spots, or partially-perforated areas may rupture and the supplied liquid and respective beverage formulations may combine.

In an embodiment, the beverage dispensing apparatus can include at least two liquid supplying piercing elements such that a first liquid supplying piercing element can pierce the lid 706 and rupture a weakened portion of the second compartment 702, and a second liquid supplying piercing element can pierce the lid 706 and rupture a weakened portion of the third compartment, such that the first, second, and third beverage formulations can be combined with fluid supplied by the liquid supplying piercing elements. Alternatively, the second and third compartments may not include weakened areas wherein the respective bases 702a, 703a are pierced by the respective liquid supplying piercing elements so that the first, second, and third beverage formulations can be combined with fluid supplied by the liquid supplying piercing elements.

A dispensing piercing element of the beverage forming apparatus can pierce the base 701a or a lower portion of the sidewall 701b of the first compartment 701 such that a beverage may be dispensed therefrom. In a further embodiment, the beverage forming apparatus can include two or more dispensing piercing elements wherein a first dispensing piercing element is operable to pierce the base 701a of the first compartment 701 and the base 702a of the second compartment 702, and the second dispensing piercing element is operable to pierce the base 701a of the first compartment 701 and the base 703a of the third compartment 703 such that the first, second, and third beverage formulations can be combined with fluid supplied by a single liquid supplying piercing element. In an additional embodiment, a single liquid supplying piercing element can be operable to pierce the lid 706 and a respective base 702a, 703a of the respective second or third compartment 702, 703, while a single dispensing piercing element is operable to pierce the base 701a of the first compartment and the respective base 702a, 703a of the second or third compartment 702, 703 that is not pierced by the single liquid supplying piercing element.

Alternatively, the base 701a, the sidewall 701b, or a portion of a corner between the base 701a and sidewall 701b of the first compartment 701 can include a weak-spot or partially-perforated area such that the first compartment 701 ruptures under a predetermined pressure that may be achieved therein such that a beverage may be dispensed therefrom.

FIG. 8A illustrates an assembly for forming a multicompartment capsule according to embodiments disclosed herein. Preferably the assembly is a single, in line assembly. The assembly includes a supply of thermoformable material 820, such as a coil of a thermoformable material. The thermoformable material 820 can be a single layer of polymer material or a multi-layer of material including one or more layers of plastic and/or metal film, such as aluminum or aluminum foil. For example, the thermoformable material 820 can be one or more layers of polyethylene (PE), polyethylene terephthalate glycol-modified (PETG), polypropylene (PP), polystyrene, polyethylene teraphalate (PET), Polyvinylidene chloride (PVdC), Ethylene vinyl alcohol (EVOH), Polytetrafluoroethylene (PTFE), Polychlorotrifluoroethylene (PCTFE), or Acrylonitrile-Methyl acrylate copolymer. In an embodiment, the multilayer construction of the thermoformable material can be respective layers of PET/EVOH/PET, PET/PVDC/PET, PP/PVDC/PET, PP/PVDC/PET, or PET/PTFE/PET, with one more optional layers of metal film or foil included therein. Preferably, the construction of the entire multicompartment capsule and lid is selected such that the multicompartment capsule and lid can be recycled without deconstruction thereof.

The thermoformable material 820 can be delivered through an optional deposition apparatus 823 that is operable to deposit one or more layers of material on the thermoformable material 820 and form a finished thermoformable sheet 825. The one or more layers can include a barrier coating, to reduce the permeability of the thermoformable material 820 such that the thermoformed material may provide a suitable oxygen and/or moisture barrier. The barrier coating can include one or more of polypropylene (PP), ethylene vinyl alcohol (EVOH), polyethylene naphthalate (PEN), or an acrylonitrile copolymer.

Preferably the deposition apparatus 823 is operable to deposit material on the thermoformable material 820 so as to produce regions of varying thickness across the thermoformable material 820. For example, to form a multicompartment capsule having first, second, and third compartments 801, 802, 803, a finished thermoformable sheet 825 can be formed that includes at least one region of a first thickness, at least one region of a second thickness that is less than the thickness of the first region, at least one third region of a third thickness that is less than the thickness of the second region, and at least one optional fourth region of a fourth thickness that can have a thickness equal to or less than the thickness the first region, a thickness equal to or less than the thickness of the second region, or a thickness equal to or less than the thickness of the third region.

In this manner, a plurality of multicompartment capsules can be mass produced wherein the respective thicknesses of the respective regions are selected so as to provide predetermined final dimensions, such as wall thickness, for the respective compartments thermoformed from the thermoformable sheet 825 having the varying regions of thickness. For example, the first region corresponds to a portion of the finished sheet of thermoformable material 825 wherein at least one first compartment 801 will be formed, the second region corresponds to a portion of the finished sheet of thermoformable material 825 wherein at least one second compartment 802 will be formed, the third region corresponds to a portion of the finished sheet of thermoformable material 825 wherein at least one third compartment 803 will be formed, and the optional fourth region corresponds to a portion of the finished sheet of thermoformable material 825 wherein at least one optional lid 806 will be formed. In an alternate embodiment, the finished thermoformable sheet 825 can have greater than or less than four regions of varying thickness such as, for example, three regions of varying thickness so as to form a multicompartment capsule that includes only a first compartment, a second compartment, and optional lid. Alternatively, the regions of varying thickness can be arranged such that certain regions of a first thickness are arranged on the thermoformable sheet of material 825 which form bases and/or sidewalls of the respective capsules while regions of a second thickness are arranged on the thermoformable sheet of material 825 which form rims of the respective capsules. Alternatively, the finished thermoformable sheet 825 can have a uniform thickness.

The finished sheet of thermoformable material 825 is then fed into a thermoforming apparatus 821 wherein the thermoforming apparatus 821 includes a mold which forms the respective compartments of the multicompartment capsules. For example, as shown in FIG. 8A, first, second, and third compartments 801, 802, 803 are formed by the thermoforming apparatus 821 wherein each compartment has a predetermined volume. The thermoforming apparatus 821 can be operable to form one or more weak-spots, such as a partially perforated area or a reduced thickness area in any of the first, second, or third compartments 801, 802, 803, such as in a respective base 801a, 802a, 803a or sidewall 801b, 802b, 803b of any of the first, second, or third compartments 801, 802, 803.

The thermoforming apparatus 821 is preferably operable to form foldable portions 804 between the respective compartments and optional lid such that the second compartment 802 may more be more readily be folded into an interior of the first compartment 801, the third compartment 803 may be more readily folded into an interior of the second compartment 802, and the lid 806 may be more readily folded to seal an opening of the third compartment 803. After the finished sheet of thermoformable material 825 is thermoformed, the thermoformed sheet 826 including a plurality of groups of first, second, and third compartments 801, 802, 803 is fed into a cutting apparatus 822 that cuts the thermoformed sheet 826 so as to form individual groups 840 of first, second, and third compartments 801, 802, 803 and an optional lid 806 for each group of compartments 840 (see FIG. 8C). The cutting apparatus forms the outwardly extending rims 801c, 802c, 803c, having an optional lid 806 such that the respective rims and lid each have a predetermined diameter, that is selected such that the group of compartments may be folded to form a final multicompartment capsule of desired dimensions.

After a group of compartments 840 has been formed, the group of compartments can be delivered to a fill, fold, and seal apparatus 850 that fills the interior of the first compartment 801 with a predetermined quantity of a first beverage formulation, and then folds the second compartment 802 at the foldable portion 804 between the first and second compartments 801, 802 such that the second compartment 802 is located in the interior of the first compartment 801. The fill, fold, and seal apparatus 850 then seals the outwardly extending rim 801c of the first compartment 801 to the outwardly extending rim 802c of the second compartment 802. The fill, fold, and seal apparatus 850 then fills the second compartment 802 with a predetermined quantity of a second beverage formulation and folds the third compartment 803 at the foldable portion 804 between the second and third compartments 802, 803 such that the third compartment 803 is located in an interior of the second compartment 802. The fill, fold, and seal apparatus 850 then seals the outwardly extending rim 802c of the second compartment 802 to the outwardly extending rim 803c of the third compartment 803. The fill, fold, and seal apparatus 850 then fills the third compartment 803 with a predetermined quantity of a third beverage formulation. In an embodiment, the fill, fold, and seal apparatus 850 can then seal the opening of the third compartment 803 with a lid 806, or alternatively, if the group of compartments includes a lid 806 integrally formed therewith, the fill, fold, and seal apparatus 850 folds the lid 806 at the foldable portion 804 between the third compartment 803 and lid 806 and seals the lid 806 to the outwardly extending rim 803c of the third compartment 803 so as to seal the opening thereof. In alternate embodiments, the fill, fold, and seal apparatus 850 is operable to fill, fold, and seal groups of compartments which contain two compartments, or groups of compartments that contain more than three compartments.

Figure 9A:
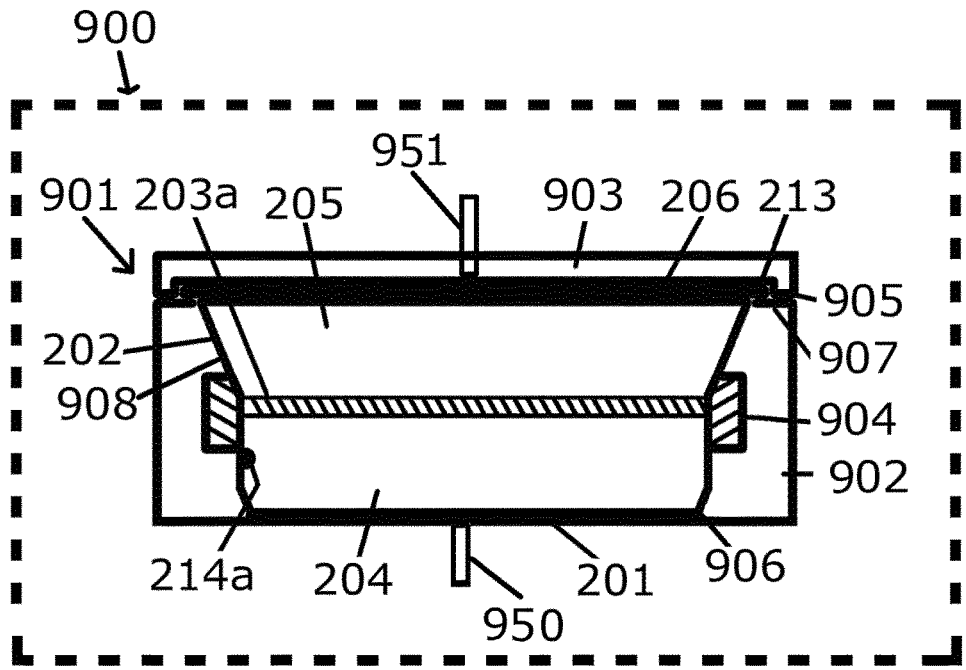
FIGS. 9A and 9B show cross-sectional views of capsule receptacles of beverage forming apparatuses as disclosed herein.
Figure 9B:
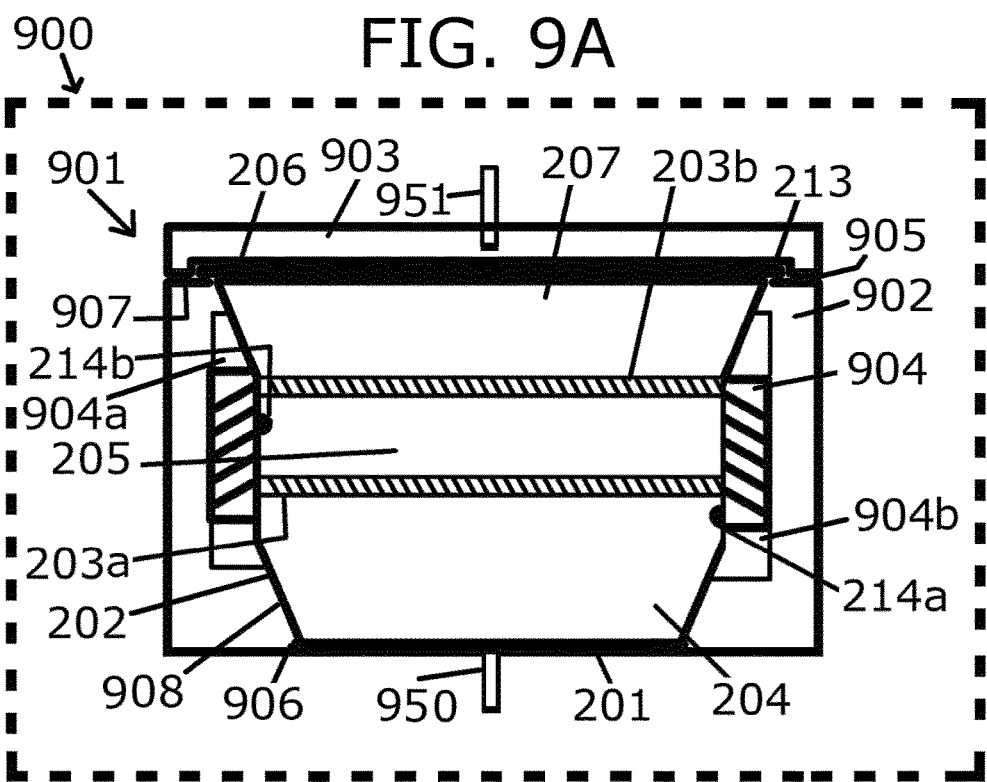

FIGS. 9A and 9B illustrate embodiments of a beverage forming apparatus 900 including a capsule receptacle 901 according to embodiments disclosed herein. The capsule receptacle 901 includes a base 902 including a cavity 908 therein which is shaped to receive a multicompartment capsule according to embodiments disclosed herein. Preferably, the capsule receptacle 901 receives a multicompartment capsule 200 such as described in FIGS. 2A-2F which includes one or more thermally detachable partitions 203 such as a horizontally extending or vertically extending thermally detachable partition that fluidly isolates a first compartment of the multicompartment capsule 200 from a second compartment thereof. The cavity 908 includes a shelf 907 surrounding an upper opening thereof upon which an outwardly extending rim 213 of the multicompartment capsule 200 can rest, such that the capsule 200 is supported in the cavity 908.

The cavity 908 includes a lower gasket 906 that seals against a lower surface 201 of the multicompartment capsule 200 to form a pressure and fluid tight seal, that isolates one or more dispensing piercing elements of the beverage forming apparatus 900 from the remainder of the cavity 908, such that a dispensing piercing element 950 can pierce a lower surface 201 of the capsule 200 and dispense a beverage therefrom. The capsule receptacle 901 also includes a lid 903 and an upper gasket 905 that seals against the shelf 907 and the lid 903, or alternatively an upper surface of the lid 206 of the multicompartment capsule 200 and the lid 903 of the capsule receptacle 901 to form a pressure and fluid tight seal, that isolates one or more liquid supplying piercing elements of the beverage forming apparatus from the remainder of the cavity 908, and prevents pressure buildup from being dissipated from an interior of the multicompartment capsule 200 as a liquid supplying piercing element 951 supplies a predetermined volume of fluid at a predetermined flow rate and temperature to the interior of the multicompartment capsule 200.

In a preferred embodiment, as shown in FIG. 9A, the capsule receptacle 901 includes a spot heater, such as ring heater 904, that is operable to heat a portion, such as an outer perimeter, of the thermally detachable partition 203a so as to detach the thermally detachable partition 203a from the side wall 203 of the capsule. When detached the respective beverage formulations separated by the partition can be combined in the interior of the capsule with fluid supplied by the beverage forming apparatus to form a beverage which may be dispensed therefrom. As shown in FIG. 9B, the ring heater 904 can be arranged to detach more than one thermally detachable partition, such as thermally detachable partitions 203a, 203b, and combine multiple beverage formulations in the interior of the capsule 200, that may be further combined with fluid and subsequently dispensed from the beverage forming apparatus into a vessel such as a drinking vessel. Alternatively, two or more ring heaters 904 can be included in the base 902 such that the respective heaters 904 can detach respective individual thermally detachable partitions included in a multicompartment capsule 200.

In an embodiment, thermally detachable partitions 203a,b can be formed of carnauba wax, and sealed to an inner surface of a sidewall 202 of the multicompartment capsule 200. In this embodiment, the ring heater 904 is preferably operable to heat an outer perimeter of each thermally detachable partition to a temperature of about 180° F. or more, such that the outer perimeter thereof begins to detach and subsequently detaches from the inner surface of the sidewall 202 of the multicompartment capsule 200. During heating of the perimeter of the one or more partitions, fluid may be supplied to the interior of the multicompartment capsule 200 so as to increase the pressure therein and aid in the detachment thereof. In a further embodiment, a gas supply may be included, which is operable increase the pressure in the multicompartment capsule 200 so as to aid in the detaching of the partition 203a. The temperature reached by the ring heater 904 is selected to be less than the melting temperature of the material that forms the multicompartment capsule 200. Further, the spot heater such as ring heater 904 preferably directs heat, and prevents spreading of the heat to regions of the sidewall that are not sealed to the thermally detachable partition 203a so as to reduce any potential degradation of a beverage formulation in the interior of a compartment of a multicompartment capsule. For example, the base 902 of the capsule receptacle 901 can be formed of a thermally insulating material, or alternatively, the ring heater 904 can include upper and lower ring insulators 904a, 904b (see FIG. 9B), and optional middle ring insulator (not shown) operable to split the ring heater 904 into an upper ring heater and lower ring heater, which prevent heat from spreading throughout the base 902, and/or portions of the sidewall 202 of the multicompartment capsule 200 which are not adjacent a thermally detachable partition. Additionally, in order to mitigate spoliation of the beverage formulations during heating of the thermally detachable partitions, fluid can be supplied by the liquid supplying piercing element 951 during heating wherein the temperature and volume of the fluid is selected to maintain the beverage formulations at temperatures below which they spoil.

While the foregoing describes in detail multicompartment capsules including beverage formulations therein (i.e., flavor systems, beverage precursors, or sensory mixtures) and methods making multicompartment capsules with reference to specific embodiments thereof, it will be apparent to one skilled in the art that various changes and modifications and equivalents to the multicompartment capsules and methods may be employed, which do not materially depart from the spirit and scope of the invention.

We claim:

1. A multicompartment capsule for use with a beverage forming apparatus, comprising at least a first compartment and a second compartment formed of a single sheet of polymer material;

the first compartment formed from the single sheet of polymer material including a first compartment base and a first compartment sidewall extending upwardly from the first compartment base wherein the first compartment sidewall includes a first compartment rim extending outwardly from an upper end thereof which surrounds an opening of the first compartment;

the second compartment formed from the single sheet of polymer material including a second compartment base and a second compartment sidewall extending upwardly from the second compartment base wherein the second compartment sidewall includes a second compartment rim extending outwardly from an upper end thereof which surrounds an opening of the second compartment;

wherein a folded portion of the single sheet of polymer material extends between an edge of the first compartment rim and an edge of the second compartment rim, and an upper surface of the first compartment rim is sealed to a lower surface of the second compartment rim such that the second compartment base and a portion of the second compartment sidewall are located in an interior of the first compartment and the interior of the first compartment is fluidly isolated;

wherein a lower surface of a lid is sealed to an upper surface of the multicompartment capsule such that the opening of the second compartment is sealed and an interior of the second compartment is fluidly isolated.

2. The multicompartment capsule of claim 1, further comprising a third compartment wherein the first, second, and third compartments are formed of the single sheet of polymer material, the third compartment including a third compartment base and a third compartment sidewall extending upwardly from the third compartment base wherein the third compartment sidewall includes a third compartment rim extending outwardly from an upper end thereof which surrounds an opening of the third compartment;

wherein a folded portion of the material extends between an edge of the second compartment rim and an edge of the third compartment rim, and an upper surface of the second compartment rim is sealed to a lower surface of the third compartment rim such that the third compartment base and a portion of the third compartment sidewall are located in an interior of the second compartment and the second compartment is fluidly isolated;

wherein the lower surface of the lid is sealed to an upper surface of the third compartment rim such that the opening of the third compartment is sealed.

3. The multicompartment capsule of claim 1, wherein the first compartment includes a first liquid beverage formulation in the interior thereof and the second compartment includes a second liquid beverage formulation therein; and
(a) the first liquid beverage formulation is reactive with the second liquid beverage formulation; or
(b) the first liquid beverage formulation includes aroma compounds in ethanol and the second liquid beverage formulation includes taste and/or mouthfeel compounds in water.

4. The multicompartment capsule of claim 1, wherein the lid is sealed to the upper surface of the second compartment rim with an adhesive.

5. The multicompartment capsule of claim 1, wherein the single sheet of polymer material is formed of polyethylene (PE), polyethylene terephthalate glycol-modified (PETG), polypropylene (PP), polystyrene, polyethylene teraphalate (PET), Polyvinylidene chloride (PVdC), Ethylene vinyl alcohol (EVOH), Polytetrafluoroethylene (PTFE), Polychlorotrifluoroethylene (PCTFE), or Acrylonitrile-Methyl acrylate copolymer.

6. The multicompartment capsule of claim 1, wherein the lid is ultrasonically welded to the upper surface of the second compartment rim.

7. The multicompartment capsule of claim 1, wherein the lid is heat sealed to the upper surface of the second compartment rim.

8. The multicompartment capsule of claim 1, wherein the lid is formed of polyethylene (PE), polyethylene terephthalate glycol-modified (PETG), polypropylene (PP), polystyrene, polyethylene teraphalate (PET), Polyvinylidene chloride (PVdC), Ethylene vinyl alcohol (EVOH), Polytetrafluoroethylene (PTFE), Polychlorotrifluoroethylene (PCTFE), or Acrylonitrile-Methyl acrylate copolymer.

9. The multicompartment capsule of claim 1, wherein the lid has a multilayer construction formed of respective layers of PET/EVOH/PET, PET/PVDC/PET, PP/PVDC/PET, PP/PVDC/PET, or PET/PTFE/PET.

10. The multicompartment capsule of claim 1, wherein the lid has a multilayer construction formed of respective layers of PET/EVOH/PET, PET/PVDC/PET, PP/PVDC/PET, PP/PVDC/PET, or PET/PTFE/PET and the multilayer construction of the lid includes a layer of metal foil.

11. The multicompartment capsule of claim 1, wherein the lid is formed from the single sheet of polymer material.

12. The multicompartment capsule of claim 1, wherein the single sheet of polymer material has a multilayer construction formed of respective layers of PET/EVOH/PET, PET/PVDC/PET, PP/PVDC/PET, PP/PVDC/PET, or PET/PTFE/PET.

13. The multicompartment capsule of claim 1, wherein the single sheet of polymer material has a multilayer construction including a metal film.

14. The multicompartment capsule of claim 1, wherein the upper surface of the first compartment rim is sealed to the lower surface of the second compartment rim with an adhesive, ultrasonic welding, or heat sealing.

15. The multicompartment capsule of claim 1, wherein the first compartment base is circular, rectangular, or oval shaped and the first compartment sidewall is a contoured sidewall that includes one or more upwardly extending sections, one or more outwardly extending sections, and/or one or more upwardly and outwardly extending sections.

16. The multicompartment capsule of claim 1, wherein the first compartment base is circular, rectangular, or oval shaped and the first compartment sidewall extends upwardly and outwardly from the first compartment base along a first portion, upwardly from an upper end of the first portion along a second portion, and upwardly and outwardly from an upper end of the second portion along a third portion, wherein the outwardly extending rim extends outwardly from an upper end of the third portion.

17. The multicompartment capsule of claim 1, wherein the second compartment base is circular, rectangular, or oval shaped and the second compartment sidewall is a contoured sidewall that includes one or more upwardly extending sections, one or more outwardly extending sections, and/or one or more upwardly and outwardly extending sections.

18. The multicompartment capsule of claim 1, wherein the second compartment base is circular, rectangular, or oval shaped and the second compartment sidewall extends upwardly and outwardly from the first compartment base along a first portion, upwardly from an upper end of the first portion along a second portion, and upwardly and outwardly from an upper end of the second portion along a third portion, wherein the outwardly extending rim extends outwardly from an upper end of the third portion.

* * * * *